United States Patent [19]
Wakui et al.

[11] Patent Number: 5,822,492
[45] Date of Patent: *Oct. 13, 1998

[54] RECORD AND PLAY-BACK SYSTEM IN WHICH A PAIR OF TRACKS OF A RECORDING MEDIUM ARE USED TO RECORD A PICTURE SIGNAL AND AN ASSOCIATED AUDIO SIGNAL

[75] Inventors: Yoshio Wakui; Kimiaki Ogawa; Nobuya Sakai, all of Tokyo, Japan

[73] Assignee: Asahi Kogaku Kogyo Kabushiki Kaisha, Tokyo, Japan

[*] Notice: The term of this patent shall not extend beyond the expiration date of Pat. No. 5,452,145.

[21] Appl. No.: 415,314

[22] Filed: Apr. 3, 1995

Related U.S. Application Data

[63] Continuation of Ser. No. 540,912, Jun. 20, 1990, Pat. No. 5,452,145.

[30] Foreign Application Priority Data

| Jun. 20, 1989 | [JP] | Japan | 1-158069 |
| Jun. 20, 1989 | [JP] | Japan | 1-158070 |
| Jun. 20, 1989 | [JP] | Japan | 1-158071 |
| Jun. 20, 1989 | [JP] | Japan | 1-158072 |
| Jun. 20, 1989 | [JP] | Japan | 1-158073 |

[51] Int. Cl.$^6$ ............... G11B 5/02; G11B 27/02
[52] U.S. Cl. ............... 386/107; 385/106; 385/121; 360/53
[58] Field of Search ............... 360/9.1, 10.1, 360/10.2, 10.3, 14.1, 19.1, 35.1, 53; 358/341, 342, 343, 906; 386/52, 54, 68, 75, 81, 95, 96, 121, 107, 106

[56] References Cited

U.S. PATENT DOCUMENTS

| 4,065,794 | 12/1977 | Shutterly | 360/19.1 |
| 4,317,131 | 2/1982 | Jerome | 360/10.1 X |
| 4,549,236 | 10/1985 | Fujiki et al. | 358/343 |
| 4,583,131 | 4/1986 | Dakin | 358/342 |
| 4,692,816 | 9/1987 | Sugiyama et al. | 358/342 |
| 4,725,897 | 2/1988 | Konishi | 360/10.1 |

(List continued on next page.)

FOREIGN PATENT DOCUMENTS

| 295148 | 12/1988 | European Pat. Off. . |
| 379444 | 7/1990 | European Pat. Off. . |
| 3933186 | 10/1989 | Germany . |
| 61-176379 | 8/1987 | Japan . |
| 62-176379 | 8/1987 | Japan . |

(List continued on next page.)

OTHER PUBLICATIONS

Patent Abstract of Japan, vol. 12 No. 24, Jan. 23, 1988 "Sound Recording System for Still Picture Disk", Momochi.
Patent Abstract of Japan 63–283375 vol. 12, No. 113 (E–729), Mar. 17, 1988.
Patent Abstract of Japan 63–034701 vol. 12, No. 243 (P–728), Jul. 9, 1988.
Patent Abstract of Japan 63–283377 vol. 13, No. 113 (E–729), Mar. 17, 1989.
English Languge Abstracts of JP–62–180686, 62–285201, 61–178178.

*Primary Examiner*—Aristotelis M. Psitos
*Assistant Examiner*—Larry T. Cullen
*Attorney, Agent, or Firm*—Greenblum & Bernstein, P.L.C.

[57] ABSTRACT

A record and play-back system in a still video device, in which a picture signal and an audio signal associated therewith are recorded on a first track and a second track of a recording medium, wherein a first code signal and a second code signal are recorded together with the associated picture signal and the associated audio signal to discriminate that the respective picture signal and audio signal are recorded together with the corresponding audio signal or the picture signal. The second track is played-back when the first code signal is recorded on the first track upon play-back of the first track. The audio signal can be be post-recorded on the second track when no signal is recorded on the second track.

9 Claims, 22 Drawing Sheets

U.S. PATENT DOCUMENTS

| | | | |
|---|---|---|---|
| 4,746,993 | 5/1988 | Tada | 358/906 |
| 4,777,537 | 10/1988 | Ueno et al. | 358/341 |
| 4,811,121 | 3/1989 | Sekimoto et al. | 360/36.1 |
| 5,018,020 | 5/1991 | Dakin | 358/341 |
| 5,063,551 | 11/1991 | Yoshio et al. | 358/342 |
| 5,130,812 | 7/1992 | Yamaoka | 358/341 X |
| 5,164,841 | 11/1992 | Takahashi | 360/14.1 X |
| 5,442,454 | 8/1995 | Aoki et al. | 360/19.1 X |

FOREIGN PATENT DOCUMENTS

| | | |
|---|---|---|
| 62-180686 | 8/1987 | Japan . |
| 62-285201 | 12/1987 | Japan . |
| 61178178 | 2/1988 | Japan . |
| 63-034701 | 2/1988 | Japan . |
| 63-283375 | 11/1988 | Japan . |
| 63-283377 | 11/1988 | Japan . |
| 1123581 | 5/1989 | Japan . |

RECORD AND PLAY-BACK SYSTEM IN WHICH A PAIR OF TRACKS OF A RECORDING MEDIUM ARE USED TO RECORD A PICTURE SIGNAL AND AN ASSOCIATED AUDIO SIGNAL

This application is a continuation of application Ser. No. 07/540,912, filed Jun. 20, 1990, U.S. Pat. No. 5,452,145.

BACKGROUND OF THE INVENTION

1. Field of the Invention

The present invention relates to a record and play-back system which can be advantageously applied to a record and play-back apparatus, such as an electronic still video camera.

2. Description of Related Art

In a recent electronic still camera, a video signal for one frame (one field) is recorded on one track or two tracks of a magnetic disc. Accordingly, the magnetic disc is controlled to rotate by one turn at a cycle of one field (1/60 second for NTSC system).

Since the magnetic disc as a recording medium is rotated at high speed, as mentioned above, a picture of one frame or pictures of several frames (2 or 5 frames) can be successively taken for a desired time within one second.

In addition to the video signals, it is possible to record audio signals with a compressed time axis.

The video signals and the audio signals can be independently or correlatively recorded.

However, such a conventional electronic still camera has no so-called "post-recording" function or has only an unsatisfactory post-recording function. Namely, it is necessary to first record the video signals and then record the audio signals in order to effect the post-recording. Consequently, it is impossible to later add the corresponding pictures to the recorded sound.

SUMMARY OF THE INVENTION

The primary object of the present invention is to provide a record and play-back apparatus in which both the audio signals and the video signals can be post-recorded.

To achieve the object mentioned above, according to a first aspect of the present invention, there is provided a record and play-back system in a still video device, in which a pair of one track and the other track of a recording medium are used to record a picture signal and an audio signal associated therewith, said one and the other tracks being adjacent to each other, wherein, a first code signal is recorded together with said picture signal on said one track, a second code signal is recorded together with said audio signal on said the other track and in the case that said first code signal or said second code signal is recorded on one of said pair of tracks, said audio signal or said video signal can possibly be post-recorded on said the other track.

With this arrangement, in case of post-recording of audio signal, the video signal is recorded on one track together with a first code signal. Conversely, in case of post-recording of video signal, the audio signal is recorded on the other track together with a second code signal.

Upon play-back of the one or another track, a post-record mode can be set, for example when the first or second code signal is detected.

There are two post-recording modes, i.e. post-recording of audio signal and post-recording of video signal. When the number of tracks on which the video signals or the audio signals are to be post-recorded, it is difficult to judge the video signal or the audio signal which is to be post-recorded on each track.

Another object of the present invention is to provide a play-back apparatus in which both the audio and video signals can be certainly post-recorded.

To achieve the object, according to another aspect of the present invention, there is provided a record and play-back system in which a picture signal or an audio signal associated therewith recorded on a pair of one track or the other track of a recording medium, together with a first code signal or a second code signal is played-back, wherein, the one or the other track is played-back when the first code signal or the second code signal is recorded on the played-back track to judge whether no signal is recorded on the associated track, so that when no signal is recorded on the associated track, it is discriminated and indicated that the associated audio signal or the video signal can be post-recorded.

In this construction, in case of post-recording of audio signal, the video signal is recorded on said one track together with a first code signal. Conversely, in case of post-recording of video signal, the audio signal is recorded on said the other track together with a second code signal.

Upon play-back of one track, when the first code signal is detected, for example, letters "AUDIO" are flickered or flashed. Conversely, when the second code signal is detected upon play-back of said the other track, for example, letters "VIDEO" are flickered. Consequently, an operator (user) can learn which of the video signal or the audio signal should be post-recorded on the associated track, thus resulting in no maloperation. Consequently, both the audio and video signals can be certainly post-recorded without confusion.

According to still another aspect of the present invention, there is provided a still video device in which a picture signal and an audio signal associated therewith are recorded on one of pair tracks, wherein the improvement comprises are cord and play-back system, in which a post-recording mode in which, after one of the picture and audio signals is recorded, the other signal is post-recorded to be associated therewith can be set, and when the picture signal is post-record ed at the post-recording mode, the picture signal is recorded on one track. When the audio signal is post-recorded at the post-recording mode, the audio signal is recorded on the other track.

With this construction, when the release switch is actuated at the post-recording mode, the recording mode is set, so that the video signal is recorded on one of said pair of tracks.

In case of the audio signal, when the release switch is actuated, the recording head is moved to the another track, so that the audio signal is recorded on the other track.

Consequently, both the video signal and the audio signal can be post-recorded.

According to still another aspect of the present invention, there is provided a still video device in which a picture signal and an audio signal associated therewith are recorded on one track and the other track of a recording medium by a recording head, wherein the improvement comprises a record and play-back system, in which a record mode in which a picture signal or the audio signal is recorded is set when a post-recording mode in which, after one of the picture and audio signals is recorded, the other signal is post-recorded to be associated therewith is set. When the picture signal is post-recorded, the recording head is moved to one track. When the audio signal is post-recorded, the recording head is moved to the other track. Upon releasing, the picture signal is recorded on the one track and the audio signal is recorded on the another track.

With this construction, upon transfer to the post-recording mode, the recording mode is set, and if the audio signal is post-recorded, the recording head is moved to the other track.

Thereafter, when the release switch is actuated, the associated signals are recorded.

Thus, the audio signal and the video signal can be more rapidly post-recorded.

According to still another aspect of the present invention, there is provided a still video device in which a picture signal and an audio signal associated therewith are recorded on one track and the other track of a recording medium by a record and play-back head, wherein the improvement comprises a record and play-back system comprising a mode changing means which, when a post-recording mode is set at a play-back mode in which said one track on which the signal has been recorded is played-back by the record and play-back head, changes the play-back mode to a record mode, so that the record and play-back head is moved to the other track.

In this arrangement, for example when the record and play-back head plays-back the video signal from said one track, the actuation of the switch changes the play-back mode to the record mode, so that the recording head is moved to said the other track (blank track).

Thus, for example when the release switch is actuated, the audio signal is post-recorded on the second track.

On the other hand, in this state, when the switch is actuated again, the mode is returned from the record mode to the play-back mode, and the record and play-back head is returned to one track to play-back the video signal.

Consequently, not only can both the picture signal and the video signal be post-recorded, but also the post-record mode can be easily released.

In case where the audio signals are post-recorded to correspond to the video signals, it is impossible to record the audio signals while viewing the image of the corresponding video signals, since the magnetic head is placed above the track on which the audio signals are recorded.

To make it possible to record one of the corresponding signals while viewing the other signal, according to the present invention, there is provided a record and play-back system, in which a picture signal and an audio signal associated therewith are recorded on one track or the other track of a recording medium by a record and play-back head, wherein a first code signal or a second code signal is recorded together with audio signal or the picture signal, and when the first code signal is detected, upon play-back of one of the first and second tracks, the record and play-back head is moved to the other track to play-back it, thereby to detect the recording state of the other. Finally, the record and play-back head is moved to the initial track.

Consequently, while looking at the still picture of one track which is played-back, the the head is moved to the other track to record the audio signal when a predetermined operation is effected, such as an actuation of the release switch etc. at a predetermined timing.

As a result, the signals which have been recorded on the associated track can be confirmed immediately before the commencement of the recording.

According to still another aspect of the invention, there is provided a record and play-back system, in which a picture signal and an audio signal associated therewith are recorded on a first track and a second track of a recording medium by a record and play-back head together with a first code signal and a second code signal for discriminating that the respective picture signal and audio signal are recorded together with the corresponding audio signal or the picture signal, and when the first code signal is detected, upon play-back of the first track, the record and play-back head is moved to the second track to play-back it. When a signal other than the associated picture signal is recorded on the second track, the record and play-back head is moved to the first track.

With this arrangement, when the second code signal is detected upon the play-back of the second track, the magnetic head (recording head) is moved to the first track. When the audio signal or the video signal which is not associated with the audio signal is recorded on the first track, the magnetic head is returned to the second track, since no post-recording can be effected. Consequently, a quick release of the post-record mode can be effected.

According to another aspect of the present invention, there is provided a record and play-back system, in which a picture signal and an audio signal associated therewith are recorded on a first track and a second track of a recording medium by a record and play-back head together with a first code signal and a second code signal for discriminating that the respective picture signal and audio signal are recorded together with the corresponding audio signal or the picture signal, and when the second code signal is detected, upon play-back of the second track, the record and play-back head is moved to the first track to play-back it. When the associated picture signal or no signal is recorded on the first track, the record and play-back head is maintained at the first track.

With this arrangement, when the second code signal is detected upon play-back of the second track, the magnetic head is moved to the first track. When the video signal corresponding to the first track has already been recorded, and when the first track is a blank track in which no signal is recorded, the magnetic head is moved to the first track.

Consequently, in the former case, the video signal can be immediately recorded. In the latter case, the corresponding video signal can be immediately post-recorded.

In a conventional electronic still video camera, the magnetic head can be selectively placed above not only the tracks on which the audio signal and the video signal are independently recorded but also the tracks on which the audio signal and the video signal are correspondingly recorded.

As a result, in case where the magnetic head is successively moved to the adjacent tracks one track by one track by a manual operation of an up-switch or a down-switch, etc., while monitoring the still picture, the still picture is unavoidably interrupted in the track on which the audio signal is independently recorded (although the number of such tracks is very few). The interruption of the still picture also occurs due to the movement of the magnetic head by one track when the audio signal is correspondingly recorded on the adjacent track.

In this case, to release the interruption, the magnetic head must be further moved by one track.

To solve the problem, according to another aspect of the present invention, there is provided a record and play-back system, in which when a recording means having a first mode in which a picture signal and an audio signal are in dependently recorded on different tracks, adjacent to each other, of the recording medium and a second mode in which the picture signal and the audio signal are recorded on the two adjacent tracks to correspond to each other, the magnetic head is moved at a unit of displacement of one track in the first mode and a unit of displacement of two tracks in the second mode for a quick feed of the picture signal which is played-back.

With this arrangement, for example when the head displacement switch is actuated, the magnetic head can be moved by a displacement corresponding to two tracks at one time to skip the track of the audio signal is recorded.

Accordingly, it is possible to successively play-back only the tracks on which the audio signals are recorded.

BRIEF DESCRIPTION OF THE DRAWINGS

The invention will be described below in detail with reference to the accompanying drawings, in which.

DESCRIPTION OF PREFERRED EMBODIMENTS

Figure 2:
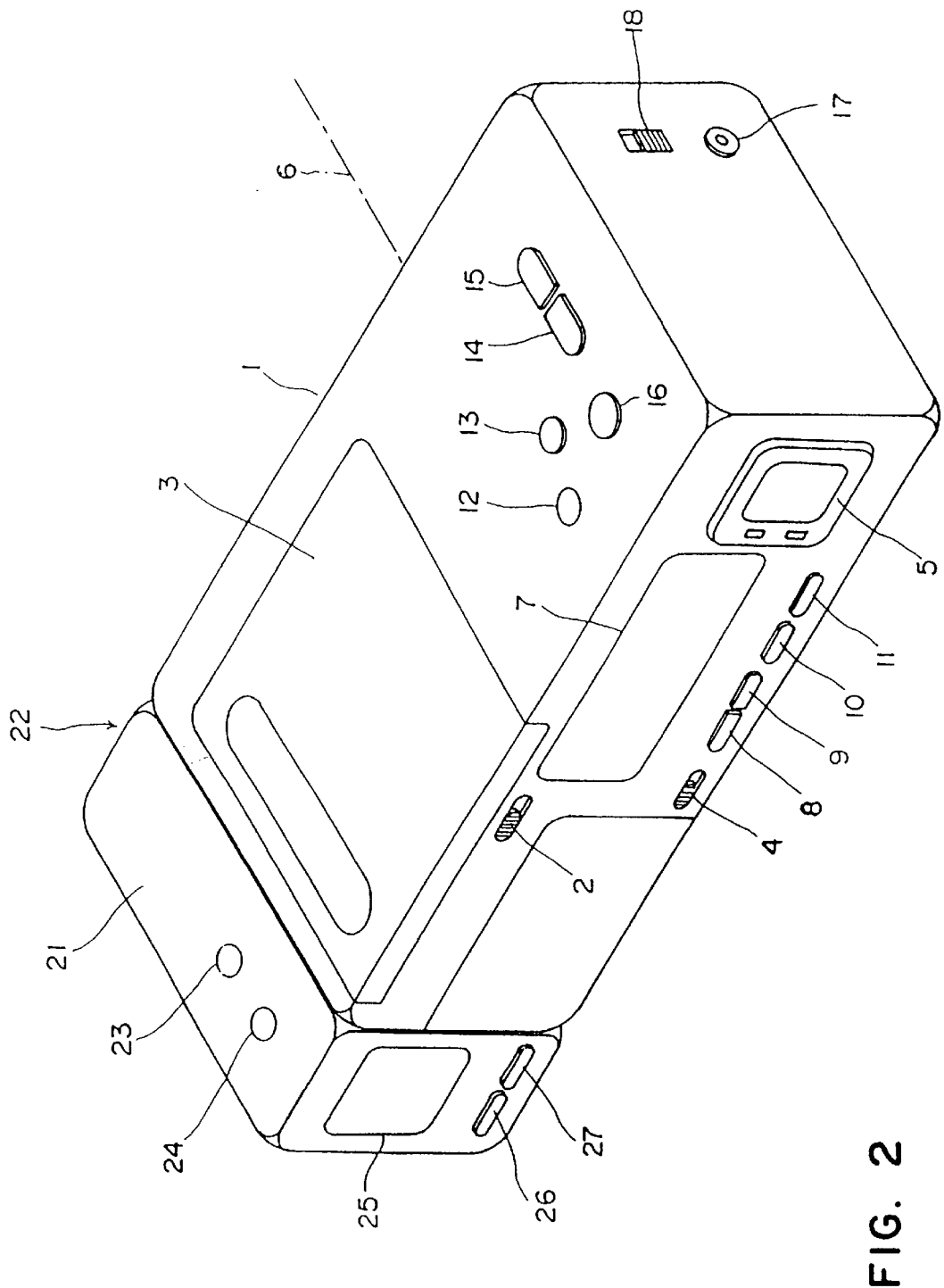
FIG. 2 is a perspective view of an electronic still video camera to which a record and play-back system according to the present invention is applied.

FIG. 2 is a perspective view of an electronic still camera to which the concept of the present invention is applied.

In FIG. 2, a camera body 1 of an electronic still video camera has a button 2 which is actuated to open a cover 3, so that a magnetic disc can be inserted in and taken out from the camera body 1.

A power switch 4 is adapted to make the power source ON and OFF. Numerals 5 and 6 designate a finder through which an object (not shown) can be viewed and an optical axis of a photographing system, respectively.

Numerals 8 and 9 designate an up-switch and a down-switch, respectively. These switches are actuated to increase and decrease the numerical information indicated in an LCD panel 7, respectively. A mode switch 10 is actuated to select modes. A selector switch 11 is actuated to more finely select the modes indicated in the LCD panel 7.

Numerals 12 and 13 designate a strobe switch and an EF switch, which are actuated to select a strobe mode in which the strobe is used and a exposure factor setting mode in which the exposure factor is set, respectively. Numerals 14 and 15 designate a wide-switch and a tele-switch to set the zooming in the wide direction and the tele direction, respectively. Numeral 16 is a video release switch which is actuated to take a picture.

Numeral 17 designates an output terminal to which a monitor device (not shown) is connected, so that the audio and video signals are output thereto. The AV mode and the dubbing mode are selected by a mode change switch 18.

A sound adaptor 21 is provided on the camera body 1 in accordance with need. The sound adaptor 21 has a microphone 22 provided on the front face of the sound adaptor 21, a sound collecting switch 23 which is adapted to collect the audio signals from the microphone 22, an audio release switch (an audio recording switch) 24 which is actuated to record the collected audio signals onto the magnetic disc, an LCD panel 25, a sound collection cancel switch 26 which is actuated to erase the collected audio signals, and a mode selection switch 27 for switching the time compression mode.

Figure 1:
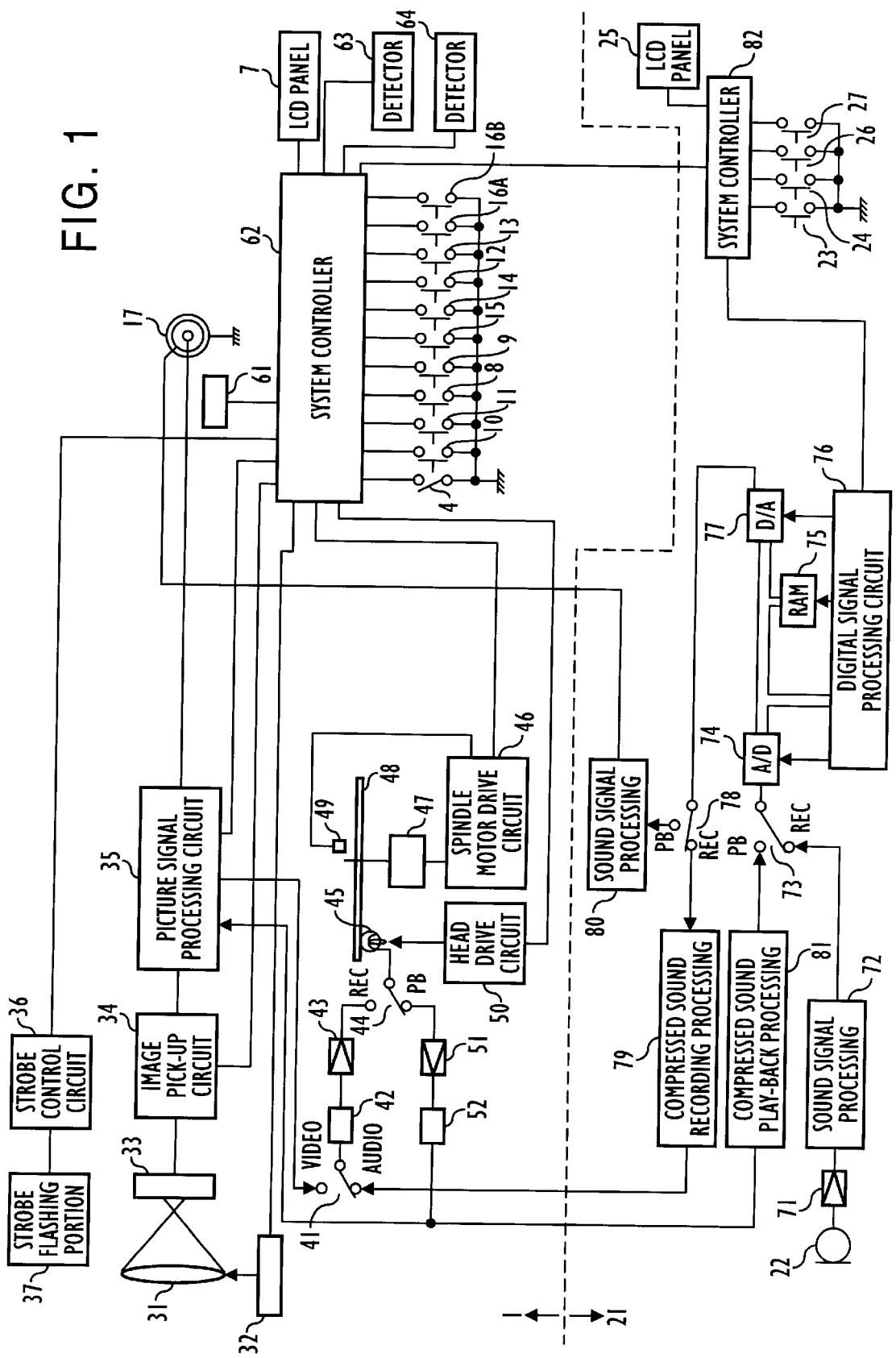
FIG. 1 is a block diagram of an internal circuit of a record and play-back system which is applied to an electronic still video camera.

FIG. 1 shows an internal control circuit of the camera body 1 and the sound adaptor 21. In FIG. 1, numeral 31 designates a zoom lens (lens group) which is drawn as a single lens for clarification and which is driven by a zoom drive circuit 32 to effect the zooming. Light which is condensed by the zoom lens 31 is incident upon an image sensor 33, such as CCD. Numeral 34 designates an image pick-up circuit which reads the video signal from the image sensor 33 to output the same to the picture signal processing circuit 35. The output of the picture signal pick-up circuit 35 is fed to the output terminal 17. A strobe control circuit 36 drives a strobe flashing portion 37.

A switch 41 is adapted to select the audio signal or the video signal to be recorded to output same to an FM modulation circuit 42. The output of the FM modulation circuit 42 is fed to the magnetic head 45 through a recording amplifier 43 and a switch 44.

A spindle motor drive circuit 46 drives a spindle motor 47. The audio and video signals are recorded on the magnetic disc 48. Numeral 49 designates a PG coil which generates PG pulses corresponding to the rotational phase of the magnetic disc 48. The magnetic head 45 is moved in a direction perpendicular to the tracks by a head driving circuit 50. Numerals 51 and 52 designate a play-back amplifier and an FM demodulation circuit for amplifying and demodulating the play-back signals which are output through the switch 44, respectively.

Numeral 61 designates a detector which detects whether the monitor is connected to the output terminal 17. A system controller 62 controls the operation of the camera body 1. Detectors 63 and 64 detect whether the sound adaptor 21 is connected to the camera body 1 and whether there is a pawl for preventing the record of the magnetic disc 48 from being erroneously erased, on a case or container (not shown) thereof, respectively.

Switches 16A and 16B are made ON when the video release switch 16 is pushed down by a half step and a full step, respectively.

In the sound adaptor 21, the signals input from the microphone is amplified and processed by an amplifier 71 and a sound signal processing circuit 72, respectively.

A record/play-back selection switch 73 selects the signals to be input to an A/D converter 74. The collected audio signals are stored in an RAM 75. The operations of the A/D converter 74, the RAM 75, the D/A converter 77 are controlled by a digital signal processing circuit.

The audio signal which is output from the D/A converter 77 is selectively output to a compressed sound recording circuit 79 or a sound signal processing circuit 80. The output of the compressed sound recording circuit 79 is output to the FM modulation circuit 42 through the switch 41. The output of the sound signal processing circuit 80 is output to the output terminal 17. A compressed sound play-back processing circuit 81 processes the audio signal which is output from the FM demodulation circuit 52 to send same to the A/D converter 74 through the switch 73.

Numeral 82 designates a system controller which controls the operation of the sound adaptor 21.

The switch 44 is controlled by the system controller 62, and the switches 73 and 78 are controlled by a system controller 82, so that the switches are connected to terminals "REC" upon recording and terminals "PB" upon play-back, respectively. The switch 41 is controlled by the system controller 62 to be connected to the terminal "VIDEO" and the terminal "AUDIO" when the video signal and the audio signal are recorded.

The basic operation of the still video camera of the invention will be discussed below in detail.

Light from the object is focused on the image sensor 33 through the lens 31 to be converted to electrical signals. The image pick-up circuit 34 reads the image signals of the image sensor 33 to output it to the picture signal processing circuit 35. The picture signal processing circuit 35 processes the image signals to convert for example to video signals of NTSC system which are output to the monitor which is connected to the output terminal 17. An object can be viewed on the monitor or through the finder 5.

When the strobe switch 12 is demanded to be used, if the video release switch 16 is completely pushed down, the system controller 62 drives the strobe flashing portion 37 through the strobe control circuit 36 to make light incident upon an object to be taken.

When the video release switch 16 is completely pushed down, the video signal output from the picture signal processing circuit 35 is input to the FM modulation circuit 42 through the switch 41 to be FM-modulated. The modulated signal is amplified by the recording amplifier 43 and is fed to the magnetic head 45 through the switch 44. At the same time, the spindle motor 47 is driven by the spindle motor driving circuit 46, so that the magnetic disc 48 is rotated at 3600 rpm. Thus, the video signal is recorded on the magnetic disc 48.

Note that the system controller 62 outputs the DPSK signal to the picture signal processing circuit 35. The picture signal processing circuit 35 superimpose the DPSK signal on the video signal. Consequently, the DPSK signal superimposed on the video signal is recorded on each track of the magnetic disc 48.

The magnetic disc 48 has for example 50 tracks formed thereon. The video signal of one field is recorded on one track. One frame selectively corresponds to the video signal of one field or two fields.

When the track is changed, the head driving circuit 50 moves the magnetic head 45 toward the inner periphery or the outer periphery of the magnetic disc 48.

In case of recording of the audio signals, the selection switch 27 is actuated to set the time compression mode. As a result, the time for collecting the sound is set to be for example 5, 10 or 20 seconds.

When the sound collecting switch 23 is actuated at a predeterminded timing, the audio signal input through the microphone 22 is amplified by the amplifier 71 to be input to the sound signal processing circuit 72. The sound signal processing circuit 72 removes the unnecessary high band component of the audio signal and adjust the signal level. The audio signal output from the sound signal processing circuit 72 is input to the A/D converter 74 through the switch 73, so that the audio signal is converted to the digital signal. The digital signals are successively memorized in the RAM 75.

Thus, the audio signals for, for example 5, 10 or 20 seconds are stored in the RAM 75 at real time.

When audio release switch 24 is completely pushed down, the audio signals stored in the RAM 75 are read out by the digital signal processing circuit 76 at about $\frac{1}{60}$ second. The digital signal processing circuit 76 adds the control codes to the audio signals to output them to the D/A converter 77.

The audio signals with the control codes which are converted to the analogue signals by the D/A converter 77 are input to the compressed sound recording and processing circuit 79 through the switch 78. The audio signal is subject to the necessary process, such as preemphasis in the compressed sound recording and processing circuit 79 and is fed to the FM modulation circuit 42 through the switch 41.

Thus, the audio signal having a compressed time axis is recorded on one track together with the control code.

As will be described hereinafter, when the audio release switch 24 is completely pushed down at the audio post recording mode, the audio signal stored in the RAM 75 is read to be recorded on an inner peripheral track which is located to be adjacent to the track on which the corresponding video signal is recorded.

The signal reproduced by the magnetic head 45 is input to the play-back amplifier 51 through the switch 44 to be amplified, and is demodulated by the FM demodulation circuit 52.

When the demodulated signal is the picture signal, it is input to the picture signal processing circuit 35 which outputs the picture signal to the monitor connected to the output terminal 17. The magnetic head 45 repeatedly plays-back the same track, a still picture appears in the monitor.

The picture signal processing circuit 35 detects the DPSK signal which is output to the system controller 62.

When the demodulated signal of the FM demodulation circuit 52 is a audio signal, the latter input to the compressed sound play-back processing circuit 81 to be subject to the deemphasis. The audio signal output from the compressed sound play-back processing circuit 81 is input to the A/D converter 74 through the switch 73, so that the digital signal thus obtained is written into the RAM 75.

The digital signal processing circuit 76 reads the control code which is input thereto together with the audio signal to output it to the system controller 82.

The digital audio signal written in the RAM 75 is read with an extended time axis by the digital signal processing circuit 76, and is converted to the analogue signal by the D/A converter 77. Thereafter, the analogue signal is input to the sound signal processing circuit 80 through the switch 78. The sound signal processing circuit 80 removes the unnecessary high band component of the audio signal and adjusts the signal level, so that the adjusted signal is fed to the monitor connected to the output terminal 17.

In case of play-back of the corresponding video and audio signals, the audio signal is first played-back to be written in the RAM 75. Thereafter, the magnetic head 45 is moved toward the outer periphery of the magnetic disc by a displacement corresponding to one track, so that the video signals recorded thereon are repeatedly reproduced as a still picture. At the same time, the audio signal is read with an extended time axis from the RAM 75 and simultaneously reproduced.

Figure 3:
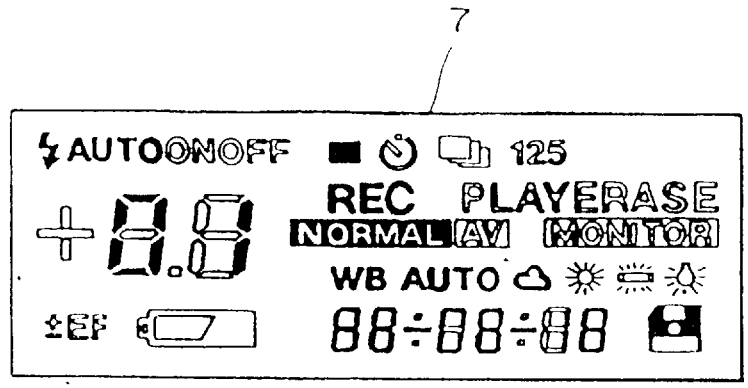
FIG. 3 is a front elevational view of an LCD panel of a camera body shown in FIG. 2.

FIG. 3 shows a front elevational view of the LCD panel 7, by way of an example.

Figure 4:
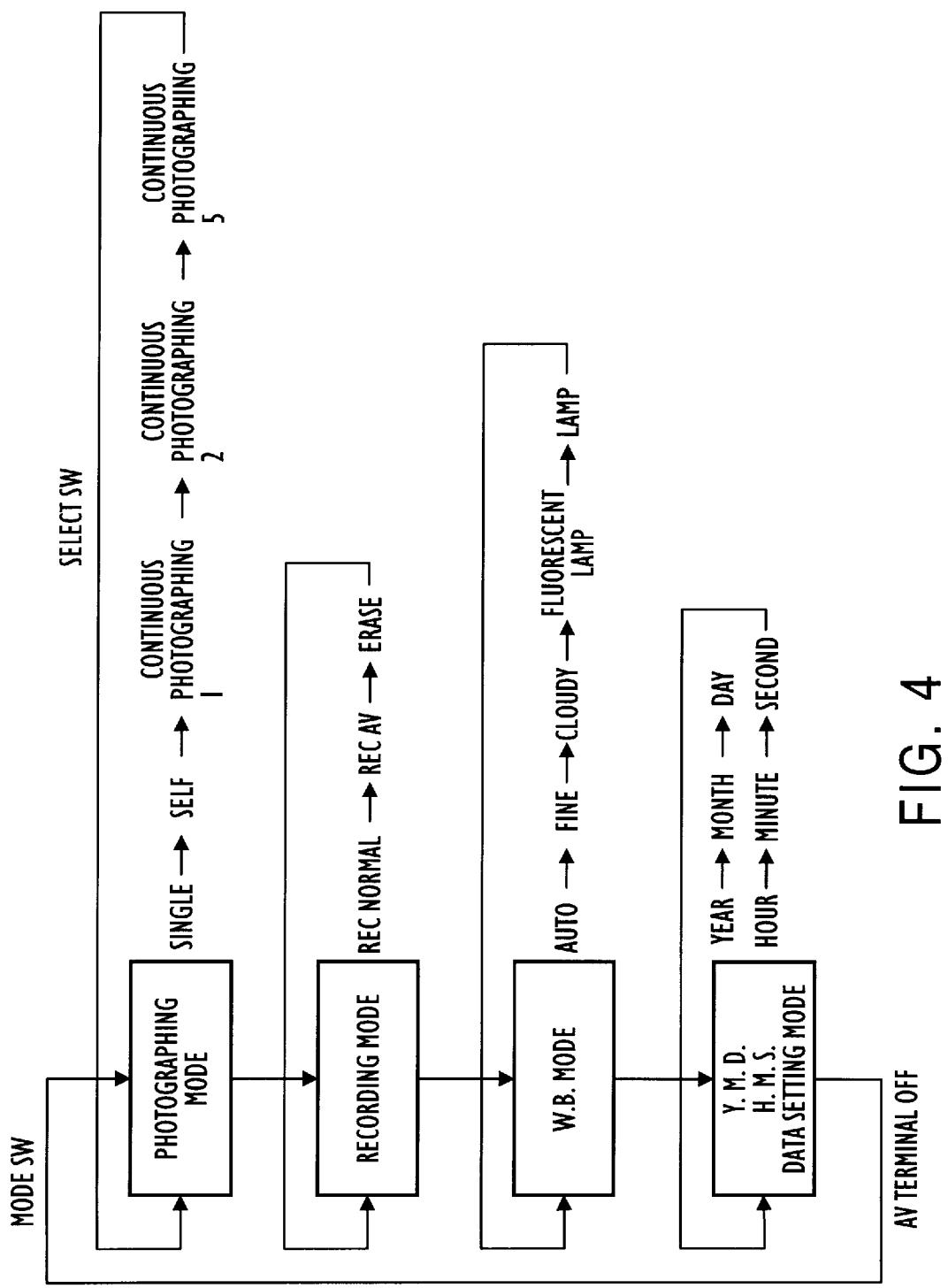
FIG. 4 is a diagram showing a successive change of modes which is carried out by a mode switch and a selector switch when no monitor is connected, according to an embodiment shown in FIG. 1.

If the detector 61 detects that no monitor is connecte to the output terminal 17, the mode displayed in the LCD panel 7 changes every time the mode switch 10 is pushed, as shown in FIG. 4.

Namely, every time the mode switch 10 is pushed down, the mode is successively and repeatedly changed to be "PHOTOGRAPHING MODE", "RECORD MODE", "WHITE BALANCE (W.B.) MODE", and "YEAR-MONTH-DATE-HOUR-MINUTE-SECOND SETTING MODE" in this order.

Furthermore, for instance, at the "PHOTOGRAPHING MODE", when the selection switch 11 is actuated, the "PHOTOGRAPHING MODE" repeatedly changes to be "Single", "Self", "Continuous Photographing 1", "Continuous Photographing 2", and "Continuous Photographing 5" in this order.

Figure 5:
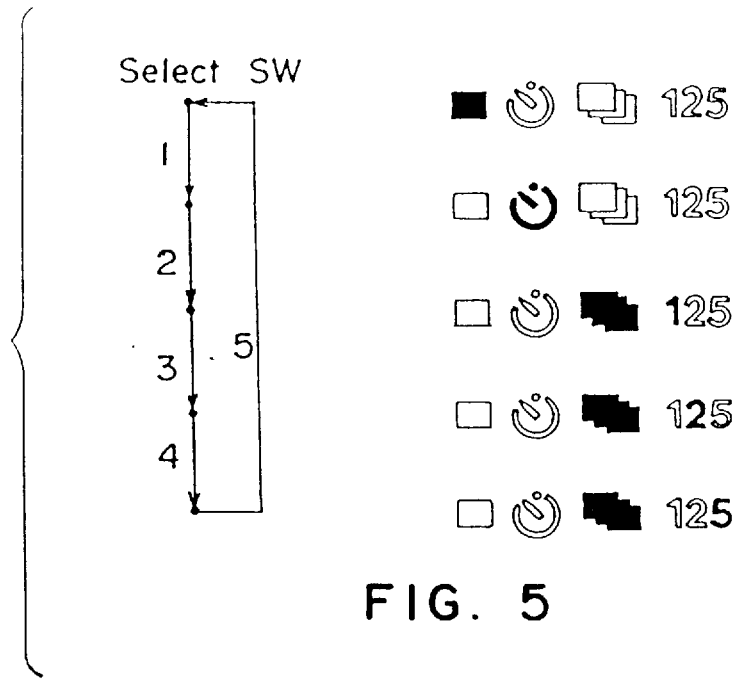
FIG. 5 is a diagram showing a successive change of indicated photographing modes when the selector switch shown in FIG. 4 is actuated.

FIG. 5 shows the indicated modes of the LCD panel 7, changed as mentioned above.

The "Single" is a mode in which a picture of one frame is taken by each actuation of the release switch 16. The "Single" is indicated by lightening a figure of one picture. The "Self" is a mode in which a picture is taken using a self-timer and is indicated by lightening a figure of a watch. The "Continuous Photographing 1", "Continuous Photographing 2", and "Continuous Photographing 5" are modes in which pictures are continuously taken when the video release switch 16 is made ON and are indicated by lightening a figure of three pictures with numerals "1", "2" and "5", respectively. These numerals represent the number of frames which can be photographed for one second.

Figure 6:
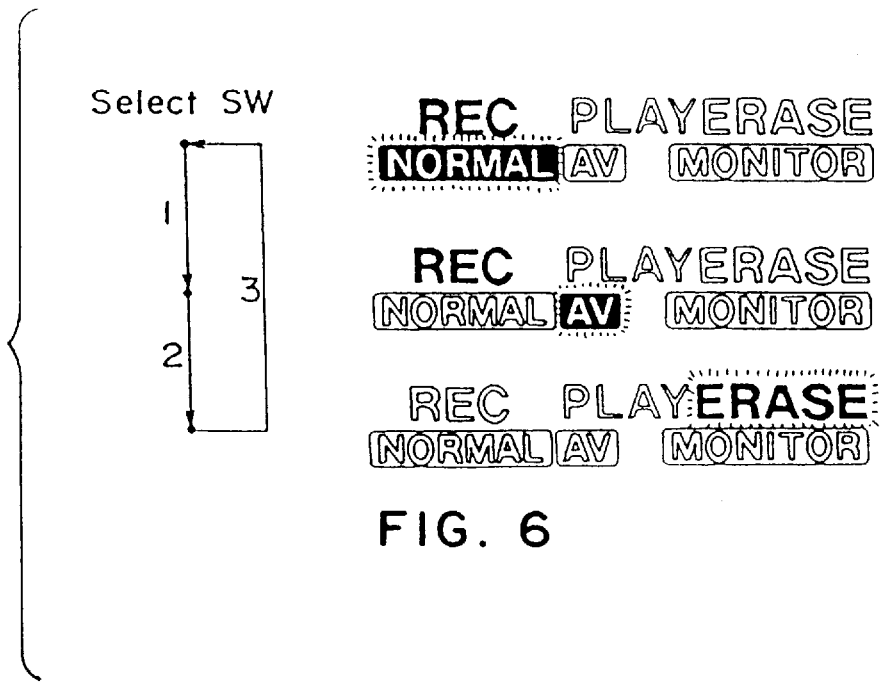
FIG. 6 is a diagram showing a successive change of indicated modes by the actuation of the selector switch shown in FIG. 4 when no monitor is connected.

When the "RECORD MODE" is selected by the mode switch 10, "REC NORMAL", "REC AV" and "ERASE" modes repeatedly appear by the actuation of selection switch 11. These modes are shown in FIG. 6.

In case of "Rec Normal", the letters "REC" and "NORMAL" are flickered. Similarly, in case of "Rec AV" and "Erase", the letters "REC" and "AV", and the letters "ERASE", are flickered, respectively. These modes "Rec Normal", "Rec AV" and "Erase" are modes in which the video signal or the audio signal is independently recorded, the video signal and the corresponding audio signal are recorded together, and the recorded video signal or the recorded audio signal is erased, respectively.

Figure 7:
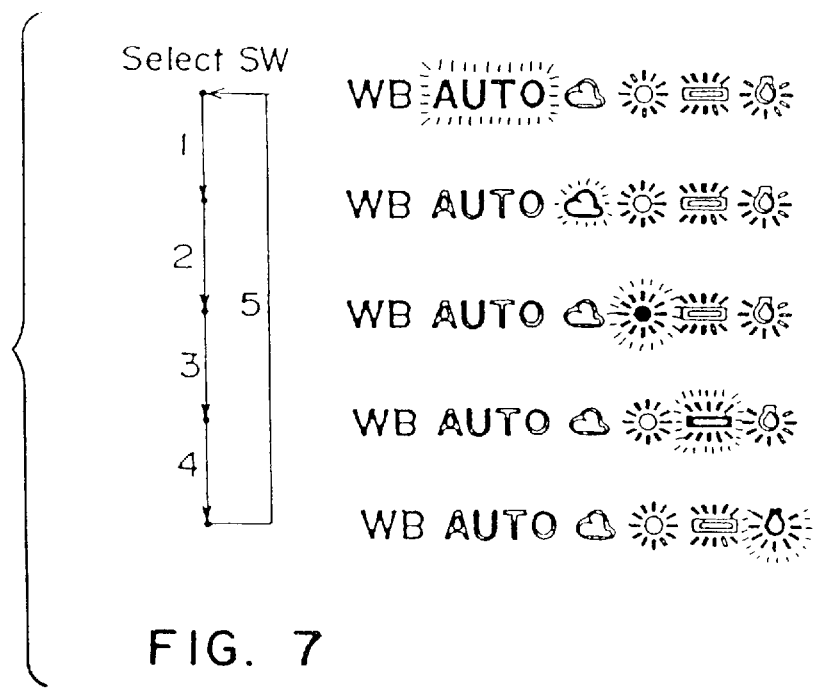
FIG. 7 is a diagram showing a successive change of indication of a white balance mode when the selector switch shown in FIG. 4 is actuated.

At the "W.B. MODE", "AUTO", "CLOUDY", "FINE", "LUMINESCENT LIGHT" and "LAMP" repeatedly appear in this order, as shown in FIG. 7. Namely, in FIG. 7, the letter of "AUTO", a figure of cloud, a figure of the sun, a figure of a fluorescent lamp and a figure of a lamp are selectively flickered together with the letter of "WB".

Note that a reference value of color temperature is changed corresponding to the various modes of the "W.B. MODE".

Figure 8:
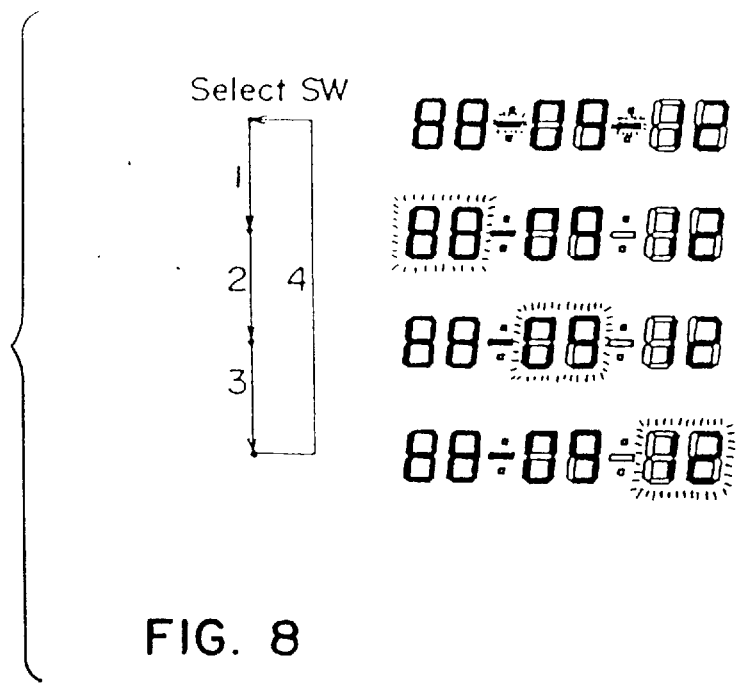
FIG. 8 is a diagram showing a successive change of indication of year-month-date mode when the selector switch shown in FIG. 4 is actuated.
Figure 9:
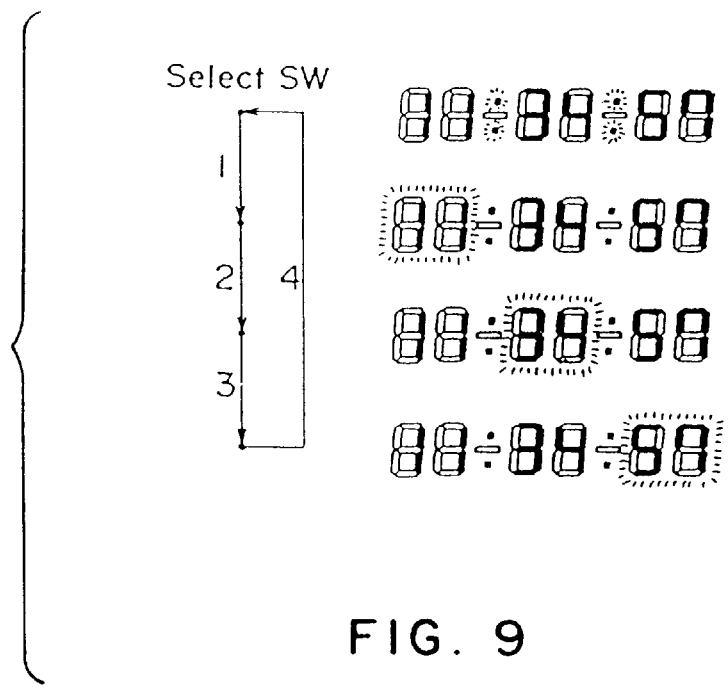
FIG. 9 is a diagram showing a successive change of indication of hour-minute-second mode when the selector switch shown in FIG. 4 is actuated.

At the "YEAR-MONTH-DATE-HOUR-MINUTE-SECOND SETTING MODE", a year-month-date mode and an hour-minute-second mode are selectively set. As shown in FIG. 8, at the year-month-date mode, the present year, month and date are indicated and the hyphens between the letters of year, month and date are flickered. Furthermore, year, month and date are successively flickered every time the selection switch 11 is actuated.

At the hour-minute-second mode, the present time is indicated and the colons between hour, minute and second are flickered. Furthermore, every time the selection switch 11 is actuated, the indications of hour, minute and second are successively flickered.

Figure 10:
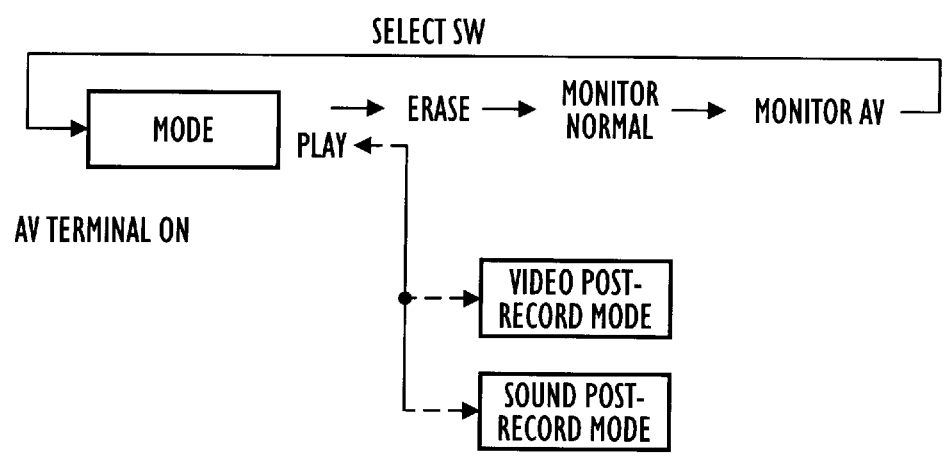
FIG. 10 is a diagram showing a successive change of modes which is caused by the actuation of the selector switch when a monitor is connected, according to an embodiment shown in FIG. 2.

If the detector 61 detects that a monitor is connected to the output terminal 17, when a desired mode is selected by the mode switch 10, the made changes in accordance with the operation of the selection switch 11, as shown in FIG. 10.

Namely, in FIG. 10, "Play", "Erase", "Monitor Normal" and "Monitor AV" modes successively and repeatedly appear. The "Play", "Erase", "Monitor Normal" and "Monitor AV" modes are modes in which the recorded video signal or audio signal is reproduced, the recorded video signal or audio signal is erased, the monitored video signal or audio signal is independently recorded, and the monitored video signal and audio signal are correspondingly recorded, respectively. These modes are indicated, as shown in FIG. 11.

Figure 11:
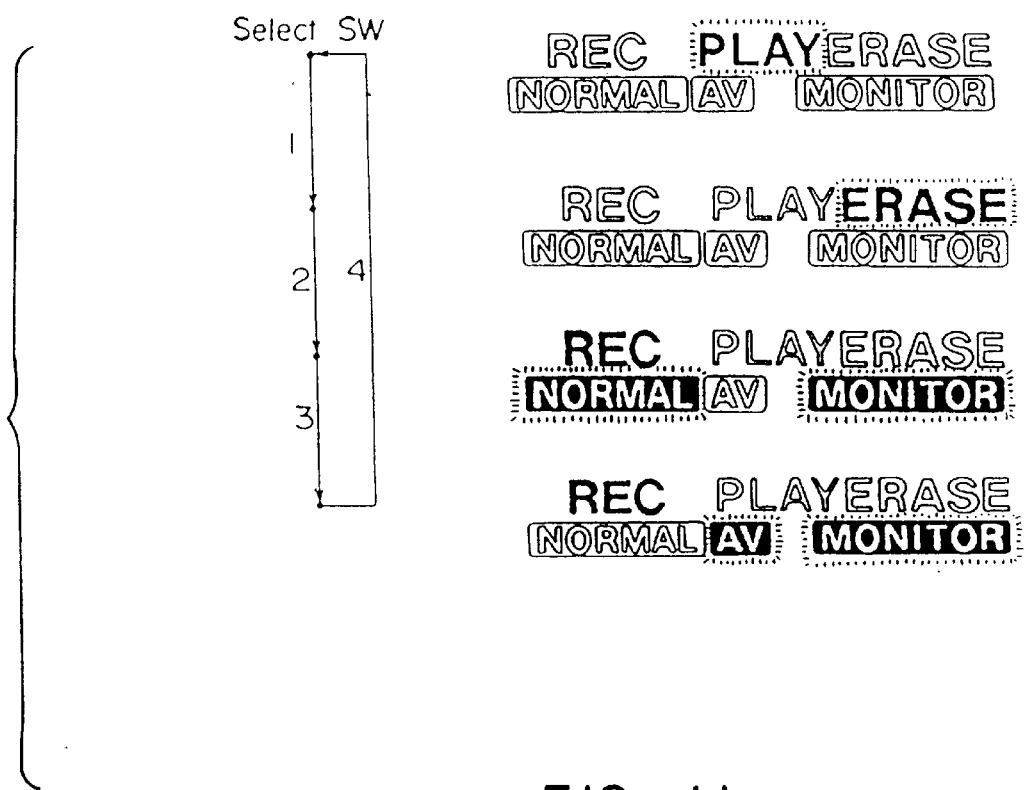
FIG. 11 is a diagram showing a successive change of indication of the modes by the actuation of the release switch when a monitor is connected, according to an embodiment shown in FIG. 2.

Namely, in FIG. 11, the "Play" mode is indicated by a flickered letter of "PLAY". Similarly, the "ERASE" mode is indicated by a flickered letter of "ERASE". The "MONITOR NORMAL" mode is indicated by a lightened letter of "REC" and flickered letters of "NORMAL" and "MONITOR". Similarly, the "MONITOR AV" mode is indicated by a lightened letter of "REC" and flickered letters of "AV" and "MONITOR".

At the "Play" mode, if the mode permits the video signal or audio signal to be post-recorded, the mode is transferred to the video post-recording mode or audio post-recording mode and not to the "Erase" mode by the actuation of the selection switch 11. A further actuation of the selection switch 11 returns the mode to the "Play" mode.

Although it is possible to provide a special switch for setting the post-recording, the use of the mode switch 10 and the selection switch 11 as a switch for setting the post-recording makes it possible to reduce the number of switches, thus resulting in an effective use of a space and a realization of a compact apparatus, as in the illustrated embodiment.

Figure 12:
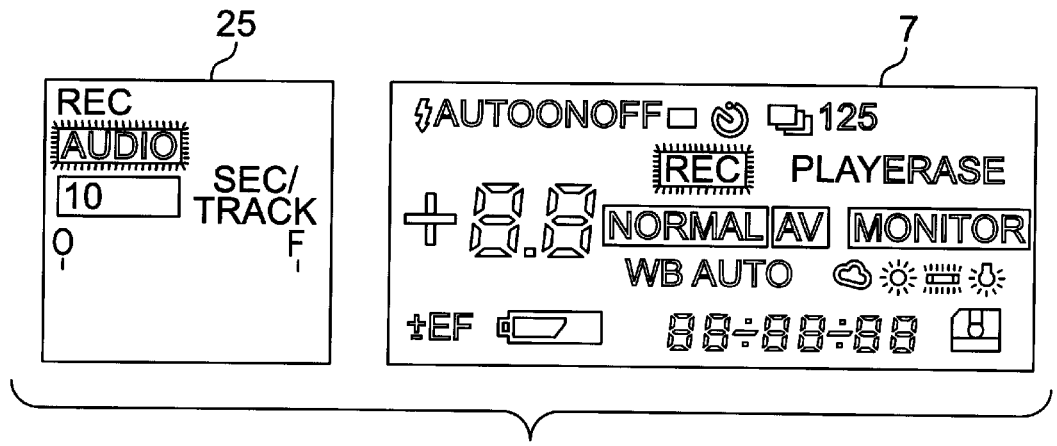
FIG. 12 is a diagram showing an indication of an audio post recording mode of LCD panels of a camera body and a sound adaptor, according to an embodiment shown in FIG. 2.
Figure 13:
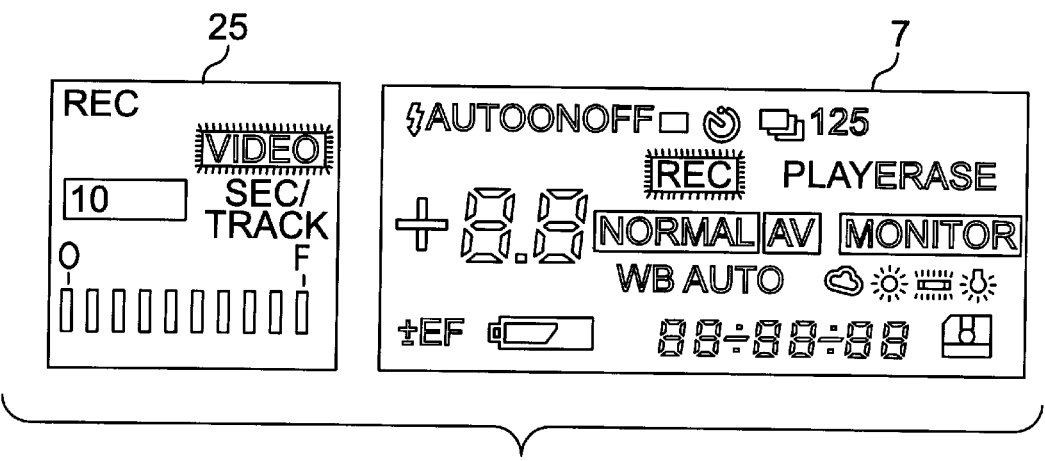
FIG. 13 is a diagram showing an indication of a video post recording mode of LCD panels of a camera body and a sound adaptor, according to an embodiment shown in FIG. 2.

At the "AUDIO POST-RECORD MODE" and "VIDEO POST-RECORD MODE", the indications of the LCD panel 7 and the LCD panel 25 change as shown in FIGS. 12 and 13, respectively.

In case of the "AUDIO POST-RECORD MODE", the letters of "PLAY" and "AV" are lightened and the letter "REC" is flickered in the LCD panel 7, as shown in FIG. 12. Also, the number (e.g. No. 08 in the illustrated embodiment) of track on which the post-recording is made is indicated together with the date.

In the LCD panel 25, the letter "REC" is lightened and the letter "AUDIO" is flickered. At the same time, the recording time (e.g. 10 seconds in the illustrated embodiment) of the audio signal set by the selection switch 27 is indicated.

In case of "VIDEO POST-RECORD MODE", as shown in FIG. 13, the indication of the LCD panel 7 is same as that of the "AUDIO POST-RECORD MODE", but in the LCD panel 25, the letter "REC" is lightened and the letter "VIDEO" (not "AUDIO") is flickered.

At the same time, a standard of time of the audio signal which is actually recorded is indicated together with the recording time (e.g. 10 seconds) which is set upon recording the corresponding audio signal. In the illustrated embodiment, the recording time is represented by the number of bars. For example, in the embodiment, one bar corresponds to one second, and accordingly the audio signals for 10 seconds are recorded, since the number of bars is 10. Note that if the set recording time is 20 seconds, one bar corresponds to 2 seconds.

As can be understood from the above discussion, since there are different indications for the video signal post-recording and the audio signal post-recording, it is possible for a photographer (user) to certainly learn which signal should be post-recorded.

Figure 14:
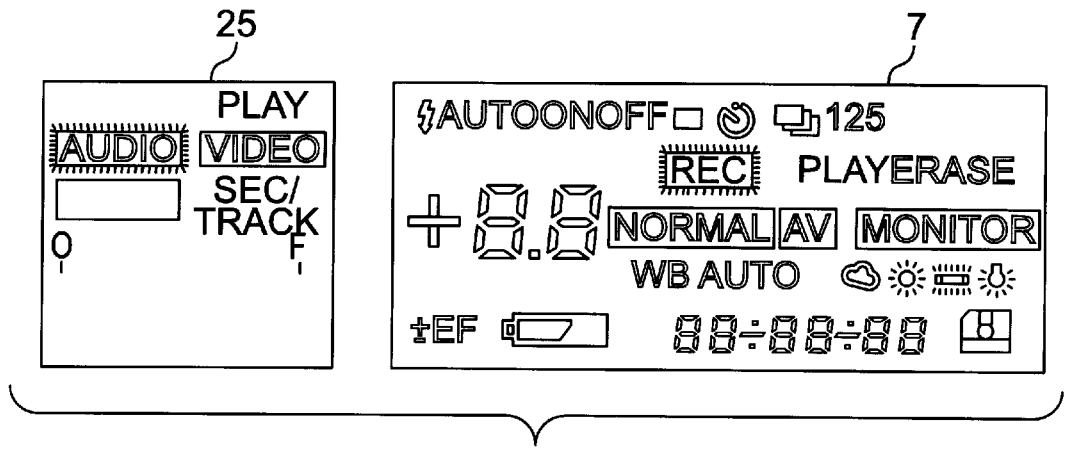
FIG. 14 is a diagram showing an indication of an audio post recording mode of LCD panels of a camera body and a sound adaptor when the video signal is reproduced, according to an embodiment shown in FIG. 2.

In a state in which no audio signal is post-recorded, if a track on which a corresponding video signal is recorded is played-back, the indication is as shown in FIG. 14.

Namely, in FIG. 14, in the LCD panel 7, the letters "PLAY" and "AV" are lightened, and the number (e.g. No. 08) of track which is being played-back is indicated together with the date (which can be of course replaced with hour, minute and second).

On the other hand, in the LCD panel 25, the letters "PLAY" and "VIDEO" are lightened, and the letter "AUDIO" is flickered since no audio signal has yet been recorded.

Figure 15:
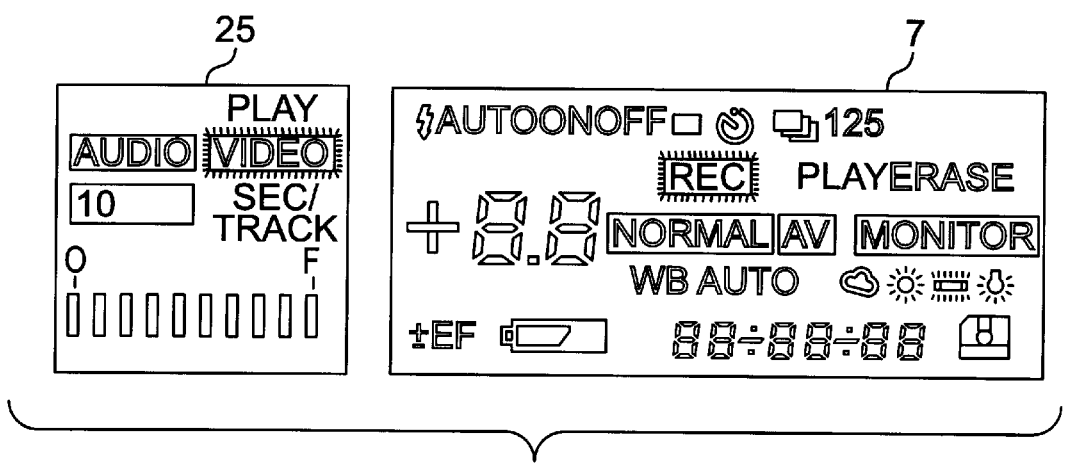
FIG. 15 is a diagram showing an indication of a video post recording mode of LCD panels of a camera body and a sound adaptor when the audio signal is reproduced, according to an embodiment shown in FIG. 2.

In a state in which no video signal is post-recorded, if a track on which a corresponding audio signal is played-back, the indication is as shown in FIG. 15.

Namely, in FIG. 15, the indication of the LCD panel 7 is same as that of the indication when no audio signal is post-recorded. However, in the LCD panel 25, the letters "PLAY" and "AUDIO" are lightened and the letter "VIDEO" is flickered since no video signal is recorded. At the same time, a standard of the recording time of the audio signal which is actually recorded is indicated together with the set recording time (e.g. 10 seconds) of the audio signal recorded on the track which is being played-back.

Figure 16:
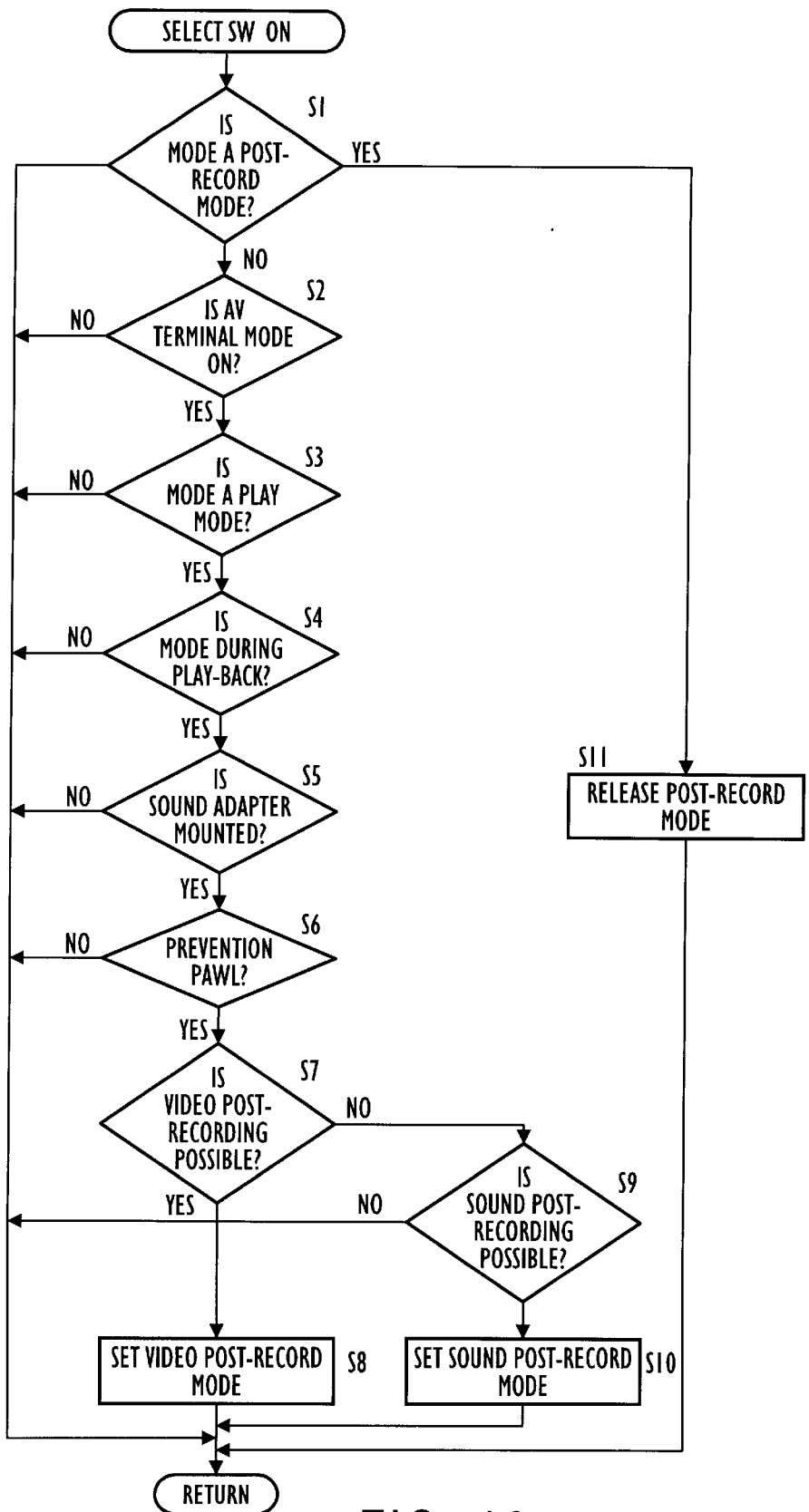
FIG. 16 is a flow chart of operations by a selector switch according to an embodiment shown in FIG. 1.

The operation for setting the video post-record mode or audio post-record mode will be explained below with reference to a flow chart shown in FIG. 16.

When the selection switch 11 is made ON, if the video or audio post-record mode has been already set, it is released (steps S1 and S11).

If no video or audio post-record mode is set, the detector 61 detects whether a monitor is connected to the output terminal 17, whether the mode is the "Play" mode and whether the operation is in play-back. On the other hand, the detector 63 detects whether the sound adaptor 21 is attached to the camera body 1, and the detector 64 detects whether there is the pawl for preventing the record from being erroneously erased (steps S2 through S6). If any one of the conditions mentioned above is not detected, no post-record mode can be set.

If all of the conditions are detected, when the video post-record is possible, the video post-record mode is set (steps S7 and S8). On the other hand, if no video post-record is possible but audio post-record is possible, the audio post-record mode is set (steps S7, S9 and S10).

Figure 17:
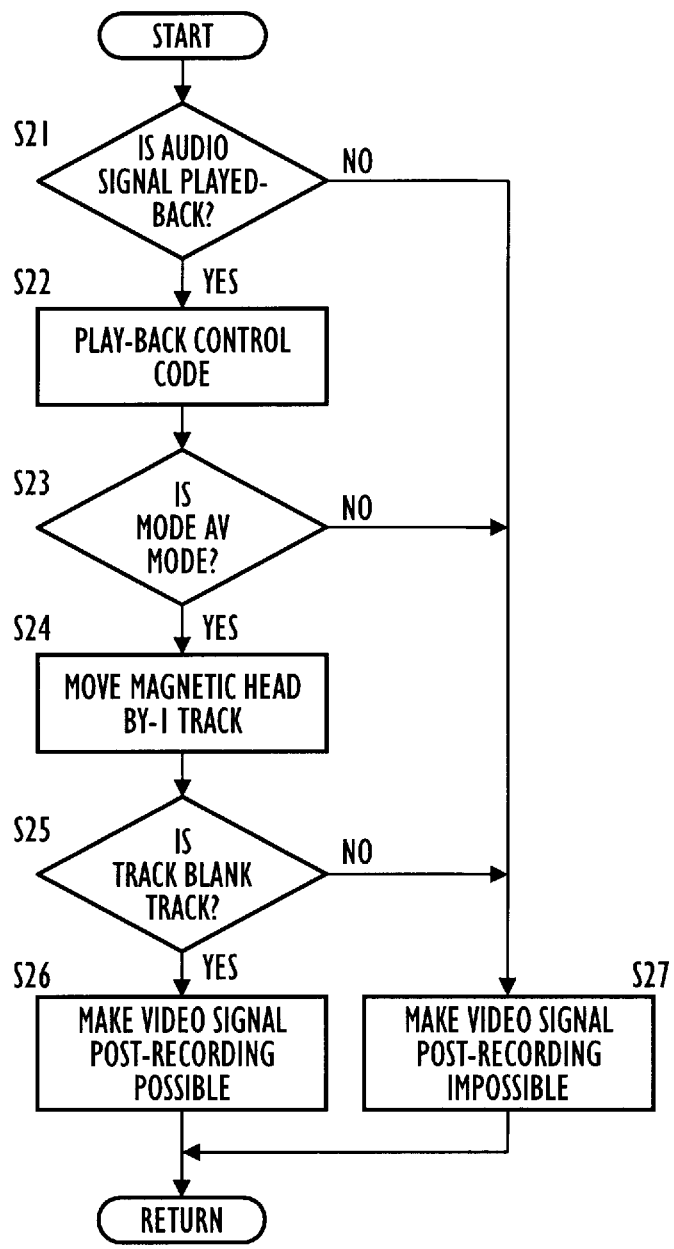
FIG. 17 is a flow chart of operations for detecting a video post recording mode, according to an embodiment shown in FIG. 1.

Whether or not the video post-record is possible is judged in accordance with a flow chart shown in FIG. 17.

When the reproduced signal of a predetermined track which is played-back not an audio signal, there is no audio signal for the video post-recording, and accordingly no video post-record can be effected (steps S21 and S27).

In this embodiment, AV mode is defined as a mode in which post-recording is readily possible. Concretely, an audio signal and a video signal can be recorded on an adjacent pair of tracks under the condition that the audio and the video signals mutually have predetermined relation. More specifically, after one signal is recorded on one track, the other signal can possibly be recorded on the other track. In this embodiment, the video signal is recorded on the outer track, and the audio signal is recorded on the inner track. When the video signal is recorded, the first code signal which discerns a video AV track is recorded with DPSK signal. On the other hand, when the audio signal is recorded, the second code signal which discerns an audio video signal is recorded with the code signal.

While, NORMAL mode is defined as a mode to record the audio signal or the video signal on a single track.

Conversely, if the reproduced signal is the audio signal, the control code contained therein is read (step S22). The control code includes codes which represents that the audio signal is solely recorded as a normal mode and that the audio signal is recorded to correspond to the video signal (AV mode).

If the control code is not the AV mode, that is, if the control code is the normal mode, no video post-record can be effected (steps S23 and S27).

If the control code is the AV mode, the magnetic head 45 is moved toward the outer periphery of the magnetic disc by a displacement corresponding to one track by the head driving circuit 50, so that whether the track is a blank track is checked (steps S24 and S25).

The corresponding video signal and audio signal are preset to be recorded on the adjacent outer and inner tracks, respectively. Consequently, if the adjacent outer track is not a blank track, no video signal can be recorded thereon, and accordingly no video post-record can be effected. Conversely, if the adjacent outer track is a blank track, the video post-record can be carried out (steps S25, S26 and S27).

Figure 18:
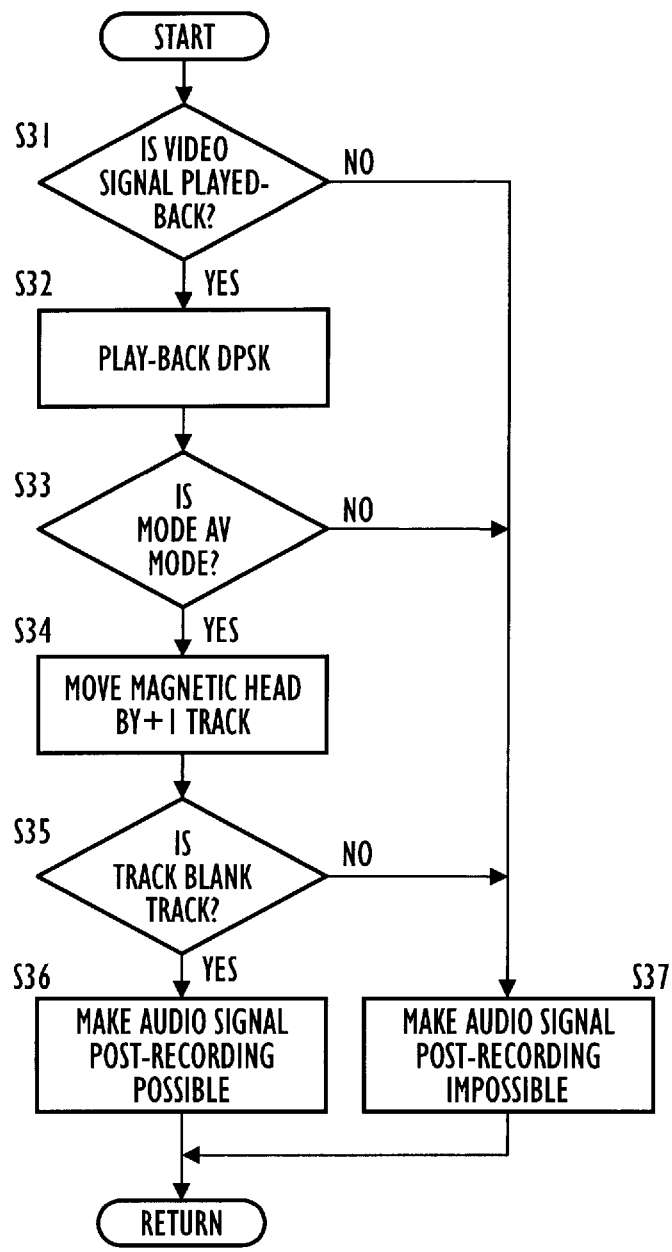
FIG. 18 is a flow chart of operations for detecting an audio post recording mode, according to an embodiment shown in FIG. 1.

On the other hand, whether the audio post-record is possible is judged in accordance with a flow chart shown in FIG. 18.

First, a predetermined track is played-back. If the played-back signal is not the video signal, no video signal for the audio post-recording exists, and accordingly, no audio post-record can be effected (steps S31 and S37).

Conversely, if the played-back signal is the video signal, the DPSK signal contained therein is read (step S32). The DPSK signal includes a code which judges whether the video signal is solely recorded at the normal mode or is recorded to correspond to the audio signal (AV mode).

If the DPSK signal includes no AV mode, that is, if the DPSK signal is the normal mode, no audio post-record is possible (steps S33 and S37).

If the DPSK signal includes the AV mode, the magnetic head 45 is moved inwardly by a displacement corresponding to one track to check whether the track is a blank track (steps S34 and S35).

If the adjacent inner track is not a blank track, no corresponding audio signal can be recorded, and accordingly, no audio post-record is possible. Conversely, if the adjacent inner track is a blank track, the audio post-record can be effected (steps S35, S36 and S37).

Figure 19:
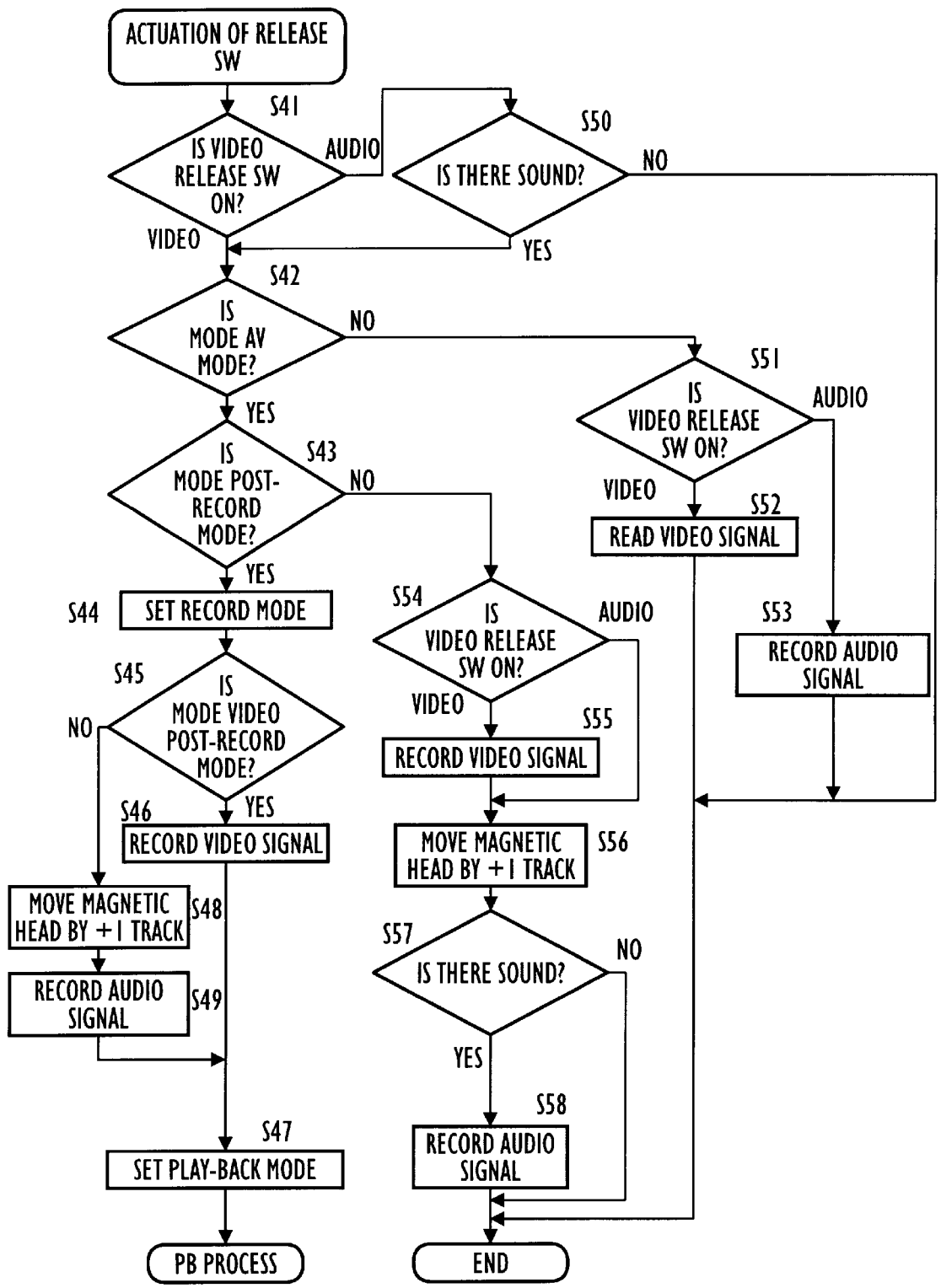
FIG. 19 is a flow chart of operations by a release switch, according to an embodiment shown in FIG. 1.

The following discussion will be directed to the operation when the video release switch 16 or the audio release switch 24 is actuated, with reference to a flow chart shown in FIG. 19.

First, whether the switch which is actuated is the video release switch 16 or the audio release switch 24 is checked (step S41). If the video release switch 16 is actuated, when the camera body 1 is set to be the AV mode and post-record mode, the recording mode is set (steps S42 through S44).

If the set mode is the video post-record mode, the video signal is recorded on the track (steps S45 and S46). Thereafter, the play-back mode is set (step S47), and the play-back operation shown in FIG. 20 will be performed.

If the audio release switch 24 is actuated, whether the audio signal is stored in the RAM 75 is checked (steps S41 and S59). If no audio signal is stored, no record is effected because no audio signal can be recorded on the magnetic disc 48.

If the audio signal is memorized, and if the AV mode and the audio post-record mode are set, the magnetic head 45 is inwardly moved by one track, so that the audio signal can be recorded on that track (steps S48 and S49). Thereafter, the play-back mode is set (step S47), and the play-back operation shown in FIG. 20 will be performed.

If the normal mode is set in the camera body, that is, if the mode set in the camera body is not the AV mode, the video signal is independently recorded when the video release switch 16 is actuated and the audio signal is independently recorded when the audio release switch 24 is actuated (steps S42, S51 through S53).

When no post-record mode is set at the AV mode, if the video release switch 16 is actuated, the video signal is recorded (steps S43, S54 and S55). Furthermore, the magnetic head 45 is inwardly moved by one track. If the sound signal is stored in the RAM 75, the audio signal is recorded (steps S56 through S58). Conversely, if the audio release switch 24 is actuated, the magnetic head 45 is inwardly moved by one track, so that the audio signal is recorded (steps S54, S56 through S58).

Figure 20A:
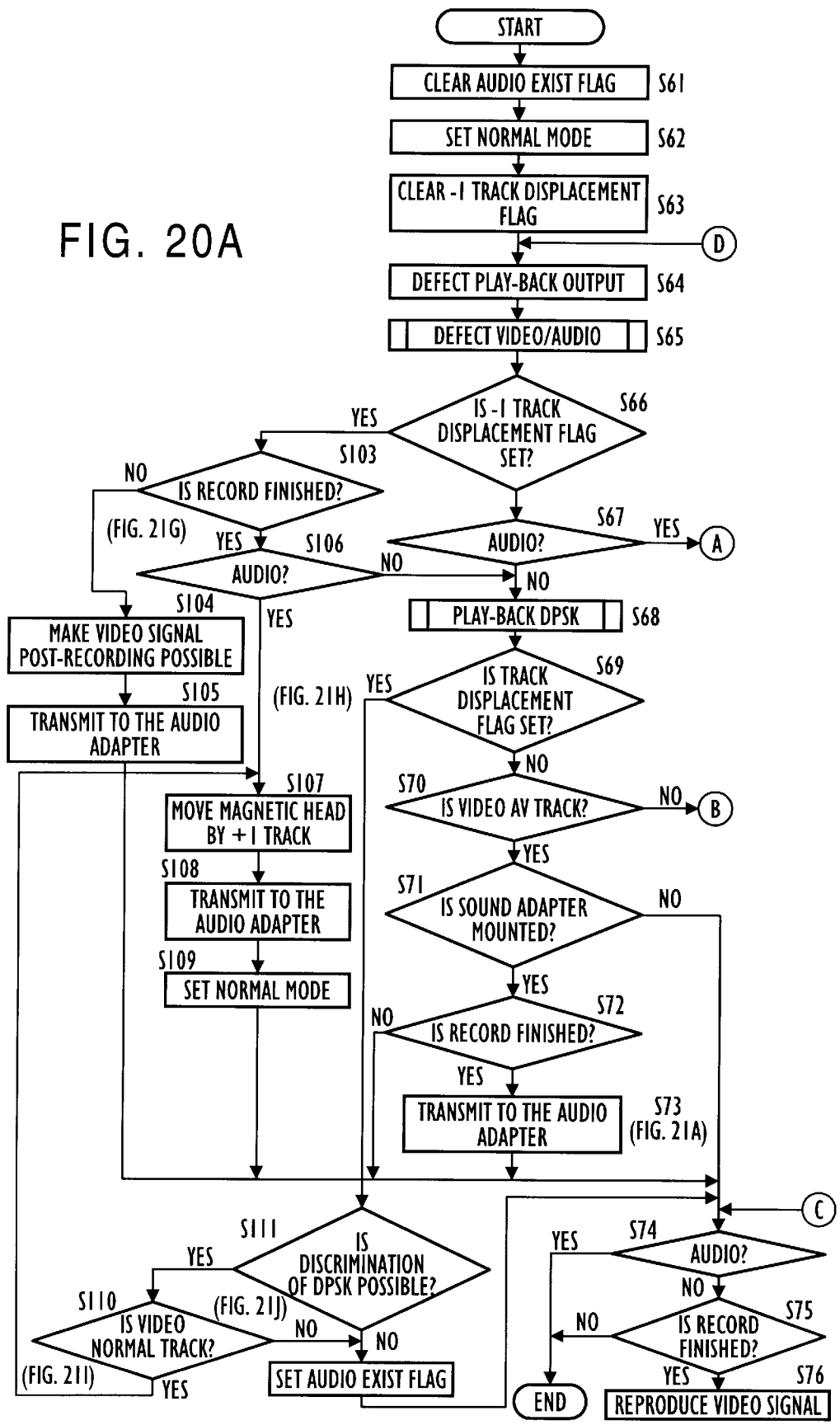
FIG. 20 is a flow chart of play-back operations, according to an embodiment shown in FIG. 1.
Figure 20B:
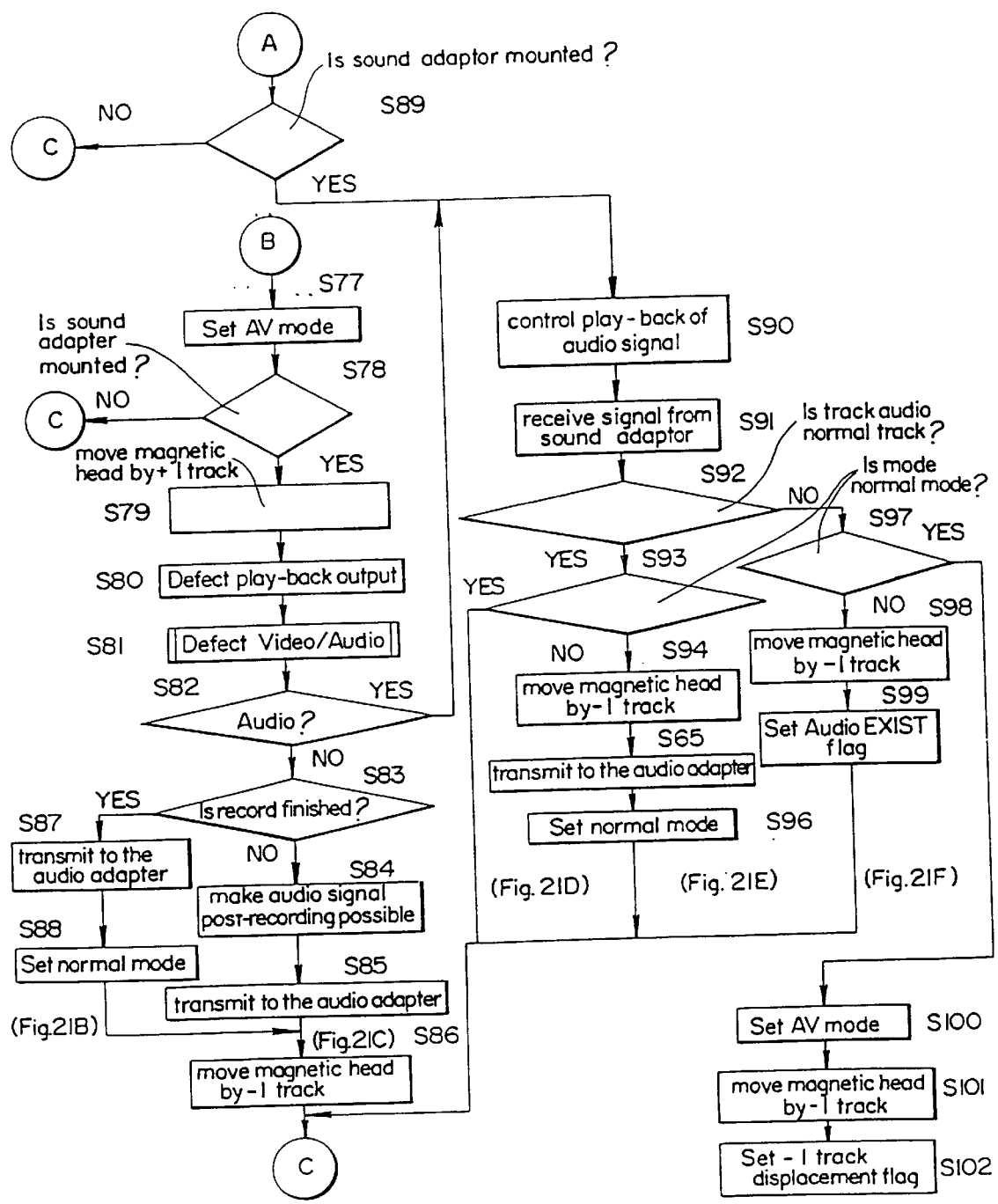

The play-back operation will be discussed below with reference to a flow chart shown in FIG. 20 and FIG. 21 which shows the movement of the track.

In FIG. 21, the direction of the inward movement of the magnetic head toward the inner periphery of the magnetic disc 48 corresponds to the right direction and the direction of the outward movement thereof corresponds to the left direction, respectively. "A" and "V" designate the audio track and the video track, respectively. Also, "N" and "AV" designate the normal track and the AB track, respectively.

First, the audio existence flag (which will be referred to as AE flag hereinafter) is cleared, so that the normal mode is set. Thereafter, −1 track displacement flag (which will be to as a displacement flag) is cleared (steps S61 through S63). Thereafter, the track on which the magnetic head 45 is positioned is played-back, so that whether the reproduced signal is the video signal or the audio signal is checked (steps S64 and S65).

After that, whether the displacement flag is set is checked. If no displacement flag is set, when the reproduced signal is the video signal and not the audio signal, the DPSK signal is reproduced (steps S66 through S68). If the DPSK signal shows that the track is not the video AV signal, and if the sound adaptor 21 is mounted, since the signal is recorded on the track, the system controller 62 judges that the track is the normal video track, so that the judgement is transmitted to the system controller 82 of the sound adaptor 21 (steps S69 through S73).

Figure 21A:
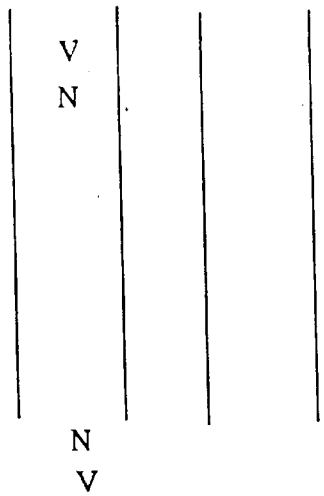
FIGS. 21A through 21K are diagrams showing movement of a magnetic head in accordance with the tracks, according to an embodiment shown in FIG. 20.

Namely, in this case, it is judged from the DPSK signal of the played-back track that the track is the normal video track, as shown in FIG. 21A.

Then, whether the reproduced signal is the audio signal and whether the signal is recorded are checked (steps S74 and S75). Since the reproduce signal is the video signal, the video play-back control is performed (step S76). Thus, the video signal is reproduced.

Figure 21B:
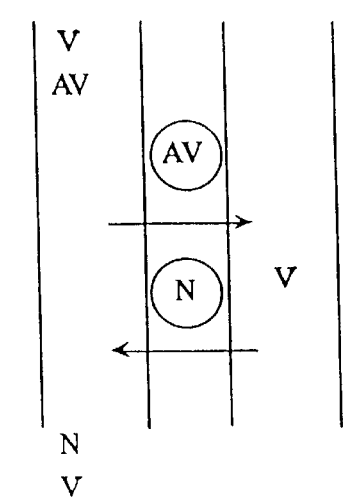

On the other hand, as shown in FIG. 21B, if the track is judged to be the video AV track by the DPSK signal, the system controller 62 sets the AV mode (steps S70 and S77). If no sound adaptor 21 is mounted, since no post-recording can be effected, the play-back of the track is then performed (steps S78, S74 through S76).

If the sound adaptor 21 is mounted, the magnetic head 45 is inwardly moved by one track, so that the signal of the track is reproduced to check whether the signal is the video signal or the audio signal (steps S79 through S81).

In an example shown in FIG. 21B, the signal recorded on the inner track is the video signal. As can be seen from the foregoing, in case of the AV mode, the video signal is recorded on the outer track of the adjacent tracks and the audio signal is recorded on the inner track thereof. Consequently, in this case, no corresponding audio signal is recorded, contrary to the content of the record of the DPSK signal. To this end, the outer track before the displacement is judged to be the normal video track, so that the judgement is supplied to the system controller 82 to set the normal mode (steps S82. S83, S87 and S88). Thereafter, the magnetic head 45 is returned to the initial track to play-back the same (steps S86, S74 through S76).

Figure 21C:
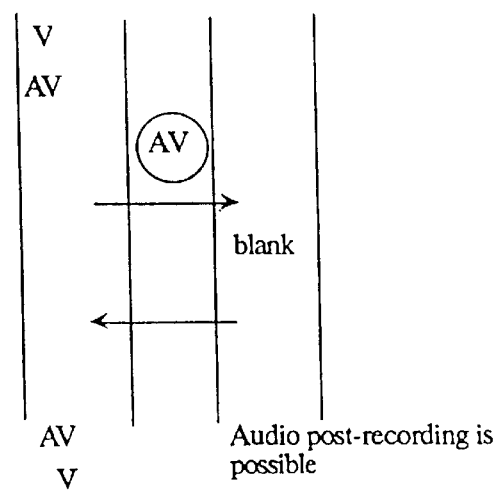

If the adjacent inner track is a blank track in which no signal is recorded, as shown in FIG. 21C, the audio signal can be post recorded on the track. Consequently, information that the initial (outer) track is the AV video track is supplied to the system controller 82 of the sound adaptor 21 (steps S83 through S85).

The magnetic head 45, after returned to the initial track, plays-back the initial track (steps S86, S74 through S76).

On the other hand, if no track displacement flag is set and if the audio signal is reproduced from the first track, no play-back operation can be performed, so long as no sound adaptor 21 is mounted (steps S67, S89 and S74).

If the audio signal is reproduced from the first track when the sound adaptor 21 is mounted, the audio play-back control is carried out to reproduce the audio signal (step S90). The system controller 82 reads the control code included in the reproduce signal, so that the read signal is received by the system controller 62 (step S91).

Figure 21D:
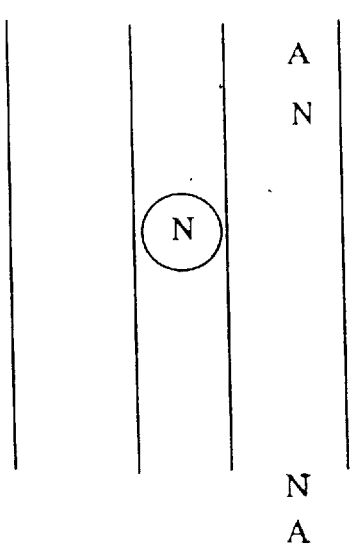

As can be seen in FIG. 21D, when it is detected that the track is the audio normal track based on the control code of the first track, and when the normal mode is set, the play-back operation is carried out (steps S92 and S93).

Figure 21E:
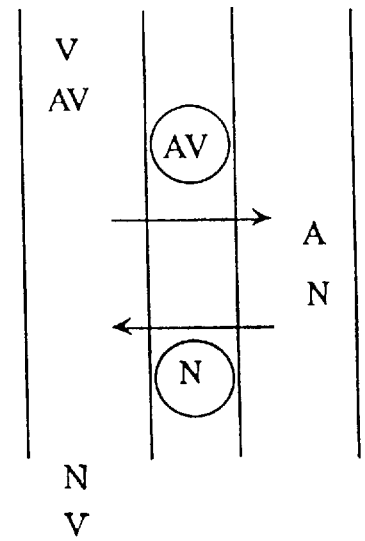

On the other hand, as can be seen in FIG. 21E, when it is detected that the first track is the video AV track based on the DPSK signal, the control proceeds to step S90 from step S82, so that the control code of the adjacent track is read. In this embodiment, although the audio normal track is detected from the control code, the first track was the video AV track, so that the AV mode has been set. Accordingly, there is a contradiction between the DPSK signal and the control code. In this case, the normal track (control code) is treated to be correct.

Consequently, after the magnetic head 45 is moved to the initial outer track, the initial track is recognized as the normal video track, so that the recognition is transmitted to the system controller 82 to set the normal mode (steps S93 through S96).

Figure 21F:
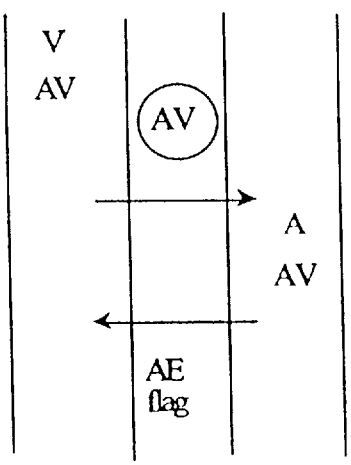

Similarly, as can be seen in FIG. 21F, if the first track is detected to be the video AV track based on the DPSK signal, and if the adjacent inner track is detected to be the audio AV track based on the control code, it is judged that the video signal and the audio signal are recorded to correctly correspond to each other. Therefore, the magnetic head 45 is moved to the initial track, so that the AE flag is set (steps S97 through S99).

The audio signal reproduced from the inner track is memorized in the RAM 75 and is output together with the video signal reproduced from the outer track.

Figure 21G:
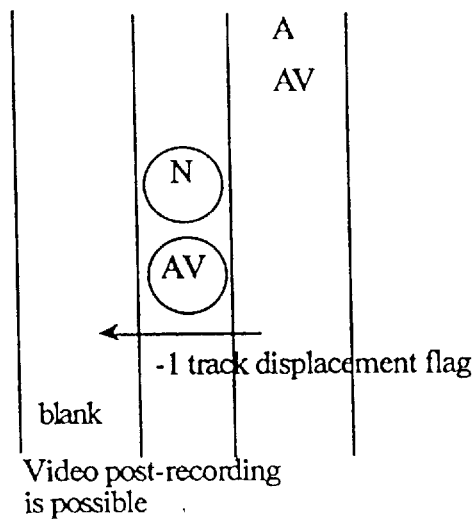

Looking at FIG. 21G, if the first track is detected to be the AV audio track based on the control code thereof, the mode which was initially set to be the normal mode at step S62 is changed to the AV mode. Thereafter, the magnetic head 45 is outwardly moved by one track, so that the displacement flag is set (steps S97, S100 through S102).

If the outer track which is reproduced is a blank track, the video signal can be post-recorded on the track. In this case, the inner track is judged to be the AV audio track, so that the judgement is transmitted to the system controller 82 (steps S64 through S66 and S103 through S105).

Figure 21H:
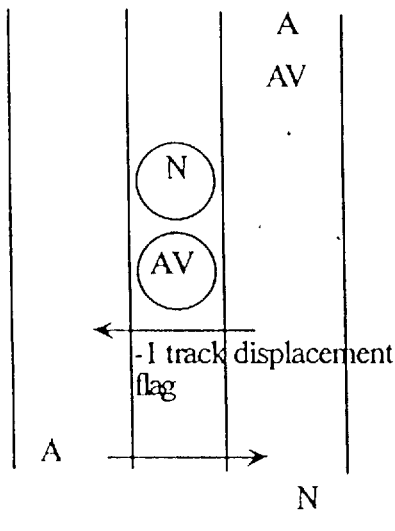

As can be understood from the foregoing, if the first track is the AV audio track, and if the mode is changed to the AV mode, so that the displacement flag is set, the magnetic head 45 is returned to the initial track when the audio signal is recorded on the outer track, as shown in FIG. 21H. The initial inner track is judged to be the normal audio track, contrary to the content of the control code, so that the judgement is fed to the system controller 82 to set the normal mode (steps S106 through S108 and S112).

Figure 21I:
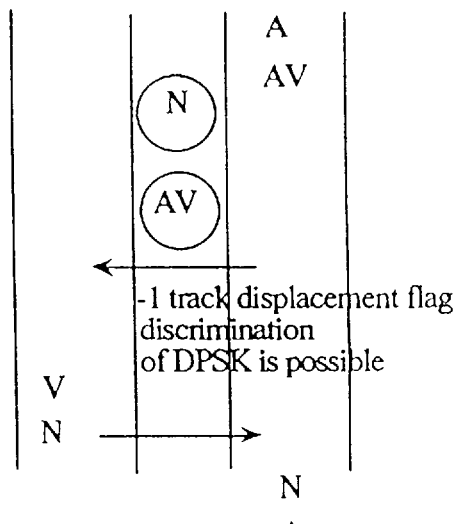

As shown in FIG. 21I, when the first track is the AV audio track and when the mode is changed to the AV mode, so that the displacement flag is set, if the outer track is judged to be the normal video track in accordance with the DPSK signal, there is a discrepancy between the control code of the inner track and the DPSK signal of the outer track. In this case, the normal mode has a priority, as mentioned before. Consequently, after the magnetic head 45 is moved to the initial track, the inner track is judged to be the normal audio track. The judgement is transmitted to the system controller 82 to set the normal mode (steps S69, S109, S110, S107, S108 and S112).

Figure 21J:
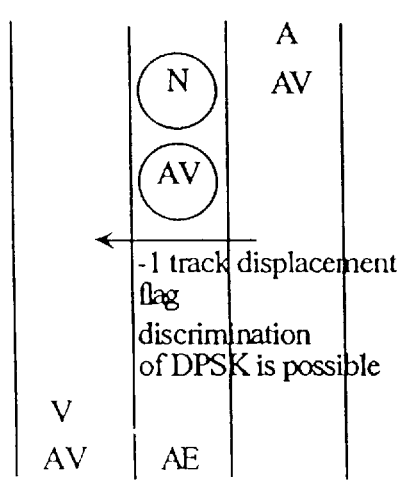
Figure 21K:
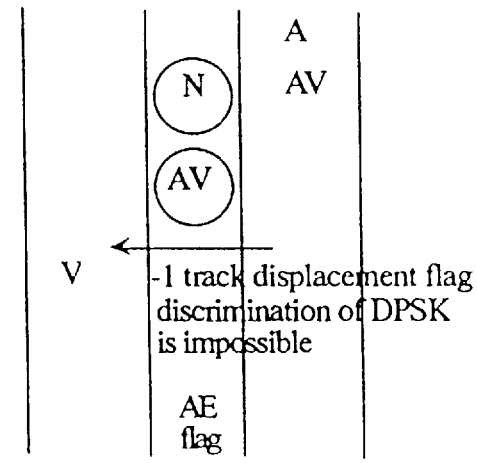

When the first track is the AV audio track and when the mode is changed to the AV mode, so that the displacement flag is set, as shown in FIG. 21J, if the outer track is judged to be the AV video track in accordance with the DPSK signal, the video signal and the audio signal are recorded to correctly correspond to each other. Therefore, in this case, the AE flag is set (steps S109 through S111).

When the first track is the AV audio track and when the mode is changed to the AV mode, so that the displacement flag is set, if the outer track is the video track but when the DPSK signal thereof can not be judged, there is no discrepancy between the control code and the DPSK signal. Accordingly, the video signal and the audio signal are recognized to be recorded with a proper correspondence therebetween. Therefore, also in this case, the AE flag is set (steps S109 and S111).

During play-back operation, the magnetic head 45 is maintained on the normal video track and the normal audio track, as mentioned above. However, in case of the AV track, the magnetic head 45 is always maintained on the video track. Namely, the magnetic head temporarily reproduces the AV audio track, and is automatically moved to the AV video track after play-back, so that the magnetic head is not maintained on the AV audio track. This is because it is not necessary to repeatedly play-back the AV audio track, since once the AV audio track is played-back, the reproduced data is memorized in the RAM 75, so that the data can be played-back from the RAM 75.

Consequently, for example when the inward movement of the magnetic head 45 by one track is manually effected, if the track is the AV audio track, the magnetic head 45 is automatically returned to the initial outer AV video track, so that no further inward movement of the magnetic head beyond the AV video track can be manually effected.

Figure 22:
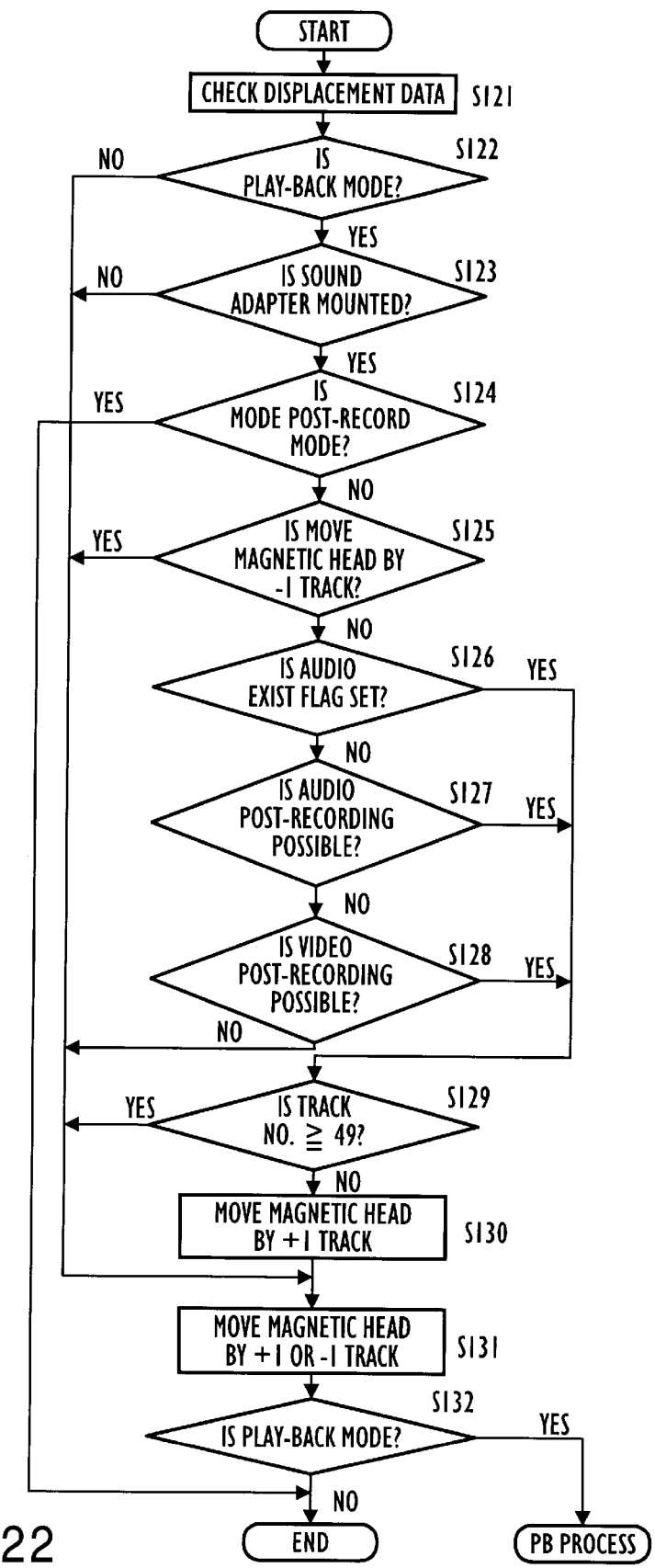
FIG. 22 is a flow chart of manual operations for moving a magnetic head, according to an embodiment shown in FIG. 1.

To avoid such a drawback, the displacement of the track to be played-back by one track by the manual operation of the up-switch 8 or the down-switch 9 is effected in accordance with a flow chart shown in FIG. 22.

First, whether the direction of the displacement is an inward direction (+1) or outward direction (−1) is checked at step S121.

When no sound adaptor 21 is mounted at the record mode, since there is no drawback as mentioned above, the magnetic head 45 is inwardly or outwardly moved one track by one track in accordance with the command (steps S122, S123 and S131).

If the video post-record mode or the audio post-record mode is set, the operation of the up-switch 8 or the down-switch 9 is ignored so as not to change the track to be recorded (step S124).

When the magnetic head 45 is outwardly moved by one track (−1 track) by a manual operation, if the track is the AV audio track, the magnetic head is automatically moved to an adjacent outward AV video track beyond the AV audio track, so that the drawback as mentioned above can be eliminated. Consequently, the magnetic head 45 can be moved in accordance with the operation (steps S125 and S131).

If no AE flag is set and if neither the audio post-record nor the video post-record are possible, no drawback is caused similarly to the foregoing (steps S126 through S128).

This can be similarly applied to the case where the present track is the 49th track from the outermost track and there is only one inner track (step S129).

Conversely, in case where the AE flag is set, or the audio post-record or the video post-record is possible, the above mentioned drawback may be caused. To avoid this, in this case, the magnetic head, after automatically inwardly moved by one track, is further moved by one track in accordance with the instructions (steps S126 through S131). Namely, when the magnetic head is manually operated to attempt to move inward by one track (+1 track), the magnetic head is moved inward by 2 tracks.

Thus such an additional inward movement of the magnetic head by one track solves the above mentioned drawback.

Although in the arrangement in which a pair of video track and audio track corresponding to the AV mode are comprised of the outer and inner tracks of the magnetic disc, the inner track constitutes the audio track in the illustrated embodiment, it is possible to correspond the video track to the inner track. In this alternative, the direction of the movement of the track is reversed.

After the track is moved, if the mode is the play-back mode, the above mentioned play-back operation is performed (step S132).

In the embodiment illustrated in FIG. 19, the record mode is set after the video release switch 16 or the audio release switch 24 is made ON. The video signal is then recorded on the track on which the magnetic head 45 is placed. The audio signal which is read from the RAM 75 is recorded on the track on which the magnetic head 45 which is further inwardly moved is placed.

Alternatively, it is possible to set the record mode upon setting the post-record mode so as to record the signal when the release switch is later actuated.

Figure 23:
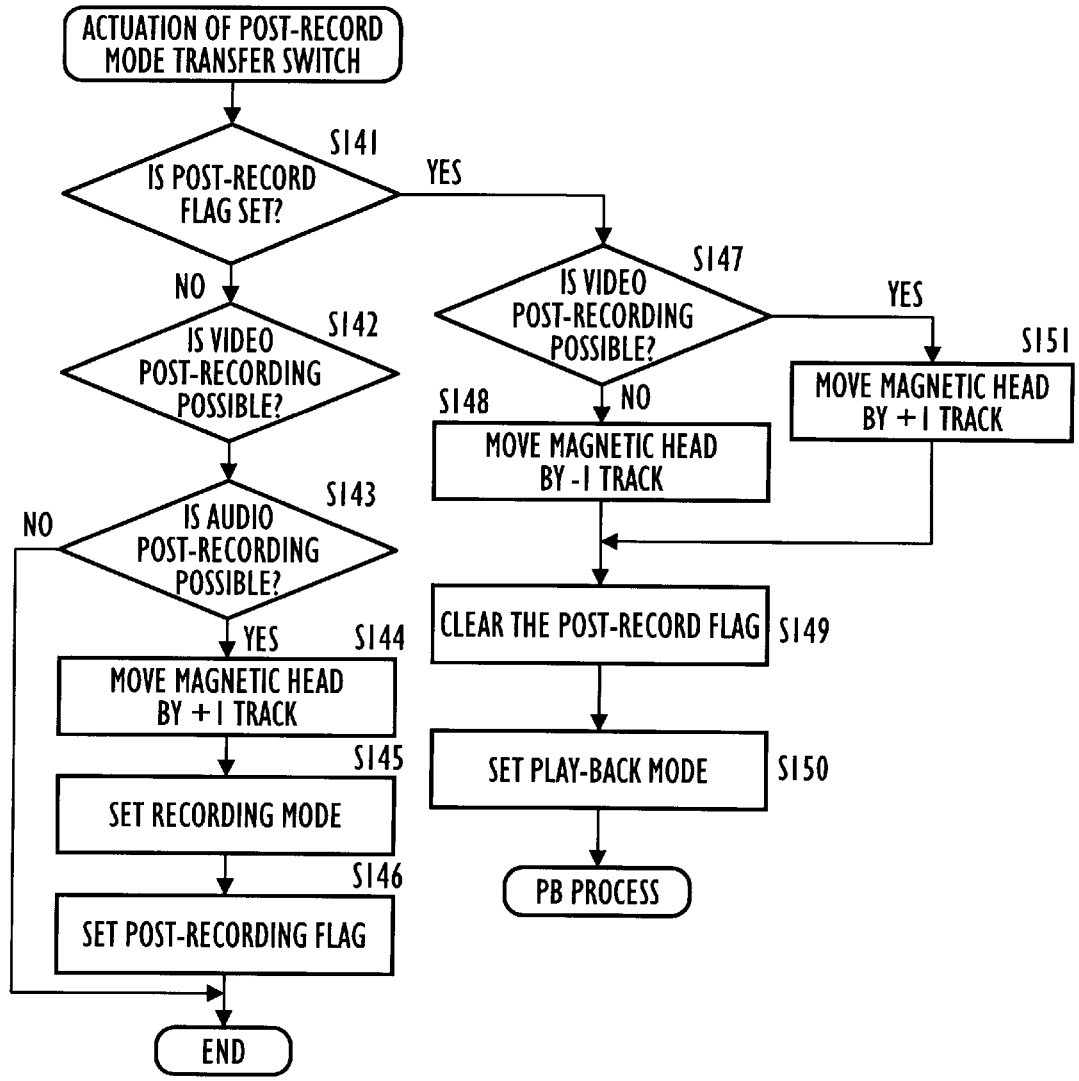
FIG. 23 is another flow chart of operations by a post recording mode transfer switch; and, FIG. 24 is a flow chart of operations when a release switch is actuated.
Figure 24:
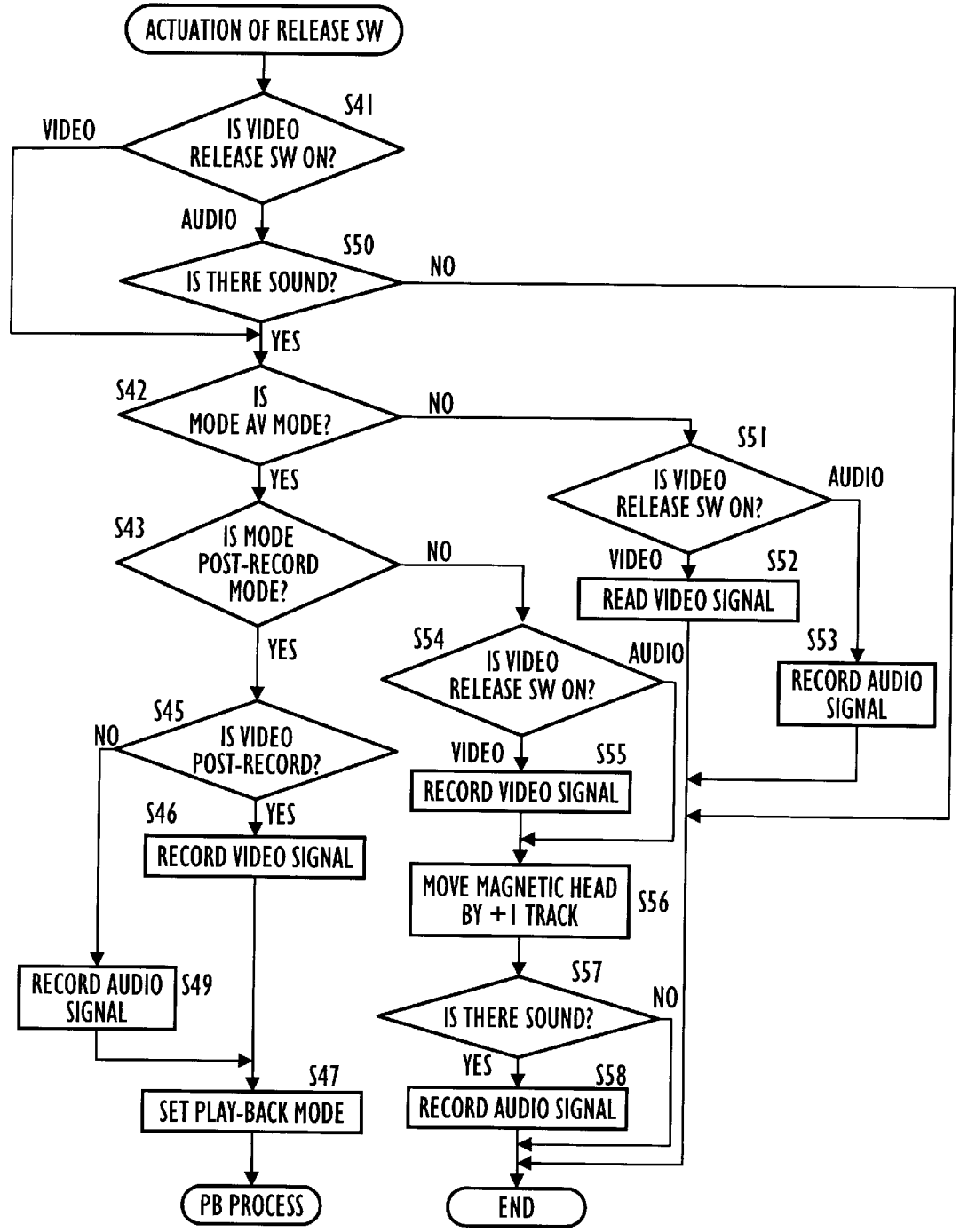

FIGS. 23 and 24 show flow charts of operations in such an alternative when the post-record mode transfer switch or the release switch is actuated.

As shown in FIG. 23 when the post-record mode transfer switch (the mode switch 10 and the selection switch 11 in the illustrated embodiment) is actuated to set the post-record mode, the post-record mode flag is read. If no post-record mode flag is set, and if the video pose-record is possible, the record mode and the post-record mode flag are set (steps S141, S142, S145 and S146).

In case where the audio post-record is possible, the magnetic head 45 is moved inwardly by one track and thereafter the record mode and the post-record mode flag are set (steps S142 through S146).

Even if the post-record mode transfer switch is actuated, if none of the video post-record and the audio post-record are possible, no operation is done (steps S142 and S143).

If the post-record mode flag has already been set when the post-record made transfer switch is made ON, the magnetic head 45 is inwardly moved by on track in case where the video post-record is possible. After that, the post-record mode flag is cleared, so that the play-back mode is set to perform the play-back operation (steps S141, S147, S151, S149 and S150).

In case where the audio post-record is possible, the post-record mode flag is cleared after the magnetic head 45 is returned outwardly by one track, so that the play-back mode is set to perform the play-back operation (steps S147 through S150).

Namely, when the post-record mode transfer switch is made ON in a position in which the post-record mode flag has already been set, the post-record mode is released.

Consequently, the operation when the release switch is made ON is as shown in FIG. 24. In comparison with the flow chart shown in FIG. 19, there are no steps S44 and S48 in FIG. 24. The other steps of FIG. 24 are identical to those of FIG. 19.

Namely, since the record mode has been already set when the post-record mode is set, and since the magnetic head 45 has already been moved to the inner track in case of the audio post-record, no operation of steps S44 and S48 is performed when the release switch is made ON. Accordingly, the operation shown in FIGS. 23 and 24 makes it possible to take and record a picture at a higher speed than that of the operation in FIG. 19.

The above mentioned descriptions are explained for the motions of the still video device using the single gap magnetic head 45. However, the present invention can be applied to a still video device using a double gap magnetic head.

In the case of the double gap magnetic head, the video signal and the audio signal can be recorded on the adjacent pair of tracks without moving the head. And these signals can be reproduced.

Accordingly, in the above embodiments, in the case that the double gas portions respectively correspond to each of an adjacent pair of tracks, reproduction and post-recording can be performed without moving the head.

However, in the case that one portion of the double gap deviates from the one of the adjacent pair of tracks, the head moves in the following manner: if the track which is reproduced by the inner side gap of the head is the video AV track, the magnetic head is moved inside by one track; if the track which is reproduced by the outer side gap is the audio AV track, the magnetic head is moved outside by one track.

As can be understood from the foregoing, according to the present invention, since the code which represents the recording by the AV mode (corresponding record mode) is superimposed on the audio signal, and since the code which represents the recording by the AV mode is superimposed an the video signal, not only the video signal but also the audio signal can be post-recorded. This results in an increase of freedom of photographing.

We claim:

1. A record and play-back system for a video device, in which a pair of tracks of a recording medium are used to record a picture signal and an audio signal associated with said picture signal, said tracks being adjacent to each other, said system comprising:

a manually operated switch;

means for moving a head to one of said pair of tracks in response to an operation of said manually operated switch;

means for changing said record and play-back system between a play-back mode and a record mode in response to said operation of said manually operated switch;

first means for determining whether said picture signal or said audio signal is recorded on said tracks, so that when said picture signal or said audio signal recorded on a second track of said pair of tracks is played back, said head is moved to a first track of said pair of tracks by said moving means and said record and play-back system is changed from said play-back mode to said record mode by said changing means when said manually operated switch is actuated and said first determining means determines that neither said picture signal nor said audio signal is recorded on said first track of said pair of tracks, wherein when said manually operated switch is again actuated after said head is moved to said one track of said pair of tracks, said moving means further moves said head to said second track of said pair of tracks and said changing means changes said record and play-back system from said record mode to said play-back mode, so that said second track of said pair of tracks may be played back; and second means for determining whether a first code signal is recorded with said picture signal on said tracks or whether a second code is recorded with said audio signal on said tracks, wherein said first code signal comprises a signal for indicating a post-recordability of said audio signal and said second code signal comprises a signal for indicating a post-recordability of said picture signal.

2. The record and play-back system of claim 1, further comprising:

means for enabling a post-recording of one of said audio signal and said picture signal when said determining means determines no signal is recorded on said second track of said pair of tracks.

3. The record and play-back system of claim 1, wherein said video device comprises an electronic camera.

4. The record and play-back system of claim 3, wherein said electronic camera comprises an electronic still camera.

5. The record and play-back system of claim 3, wherein said recording medium comprises a magnetic disk.

6. A record and play-back system for a video device, in which a pair of tracks of a recording medium are used to record a picture signal and an audio signal associated with said picture signal, said tracks being adjacent to each other, said system comprising:

a manually operated switch;

a head driving unit that moves a head to one of said pair of tracks in response to an operation of said manually operated switch;

a mode operation unit that changes said record and play-back system between a play-back mode and a record mode in response to said operation of said manually operated switch;

a first determination unit that determines whether said picture signal or said audio signal is recorded on said tracks, so that when said picture signal or said audio signal recorded on a second track of said pair of tracks is played back, said head is moved to a first track of said pair of tracks by said head driving unit and said record and play-back system is changed from said play-back mode to said record mode by said mode operation unit when said manually operated switch is actuated and said first determination unit determines that neither said picture signal nor said audio signal is recorded on said first track of said pair of tracks, wherein when said manually operated switch is again actuated after said head is moved to said one track of said pair of tracks, said head driving unit further moves said head to said second track of said pair of tracks and said mode operation unit changes said record and play-back system from said record mode to said play-back mode, so that said second track of said pair of tracks may be played back; and a second determination unit that determines whether a first code signal is recorded with said picture signal or whether a second code is recorded with said audio signal, wherein said first code signal comprises a signal for indicating a post-recordability of said audio signal and said second code signal comprises a signal for indicating a post-recordability of said picture signal.

7. The record and play-back system of claim 6, wherein said video device comprises an electronic camera.

8. The record and play-back system of claim 7, wherein said electronic camera comprises an electronic still camera.

9. The record and play-back system of claim 7, wherein said recording medium comprises a magnetic disk.

* * * * *